US011806882B1

(12) United States Patent
Edwards et al.

(10) Patent No.: US 11,806,882 B1
(45) Date of Patent: Nov. 7, 2023

(54) ROBOTIC PICKING SYSTEM AND METHOD OF USE

(71) Applicant: Plus One Robotics, Inc., San Antonio, TX (US)

(72) Inventors: Shaun Edwards, San Antonio, TX (US); Paul Hvass, San Antonio, TX (US)

(73) Assignee: Plus One Robotics, Inc., San Antonio, TX (US)

( * ) Notice: Subject to any disclaimer, the term of this patent is extended or adjusted under 35 U.S.C. 154(b) by 0 days.

(21) Appl. No.: 17/840,074

(22) Filed: Jun. 14, 2022

(51) Int. Cl.
*B25J 9/16* (2006.01)
*G06T 17/00* (2006.01)
*G06T 7/73* (2017.01)

(52) U.S. Cl.
CPC ............. *B25J 9/1697* (2013.01); *B25J 9/163* (2013.01); *B25J 9/1653* (2013.01); *G06T 7/75* (2017.01); *G06T 17/00* (2013.01)

(58) Field of Classification Search
CPC ........ B25J 9/1697; B25J 9/163; B25J 9/1653; G06T 7/75; G06T 17/00
See application file for complete search history.

(56) References Cited

U.S. PATENT DOCUMENTS

2021/0327082 A1* 10/2021 Islam .................. G06T 7/55

FOREIGN PATENT DOCUMENTS

WO   WO-2012052615 A1 *  4/2012  ............ B25J 9/1669

OTHER PUBLICATIONS

Sansoni, G., Bellandi, P. and Docchio, F., Jun. 2011. Combination of 2D and 3D vision systems into robotic cells for improved flexibility and performance. In 2011 4th IEEE International Workshop on Advances in Sensors and Interfaces (IWASI) (pp. 22-30). IEEE.*

* cited by examiner

*Primary Examiner* — Zhitong Chen
(74) *Attorney, Agent, or Firm* — Outlier Patent Attorneys, PLLC

(57) ABSTRACT

In an aspect of the disclosure, a method, a computer-readable medium, and an apparatus are provided. The apparatus may generate a binary intermediate mask model from 2D image data and 3D data obtained from a background image and a component image. Because the intermediate mask model is binary, erosion and dilation (e.g., 2D data processing) may be used to remove noise from the intermediate mask model. The augmented intermediate mask model with any erroneous and/or missing data corrected, may be applied to the second aligned model. The pixels in the second aligned model that correspond to pixels in the augmented intermediate mask model that are assigned a value of 1 may be identified as foreground pixels. Then, the vision system may generate foreground object data using the 2D image data and the 3D data in the foreground pixels from the second aligned model.

18 Claims, 15 Drawing Sheets

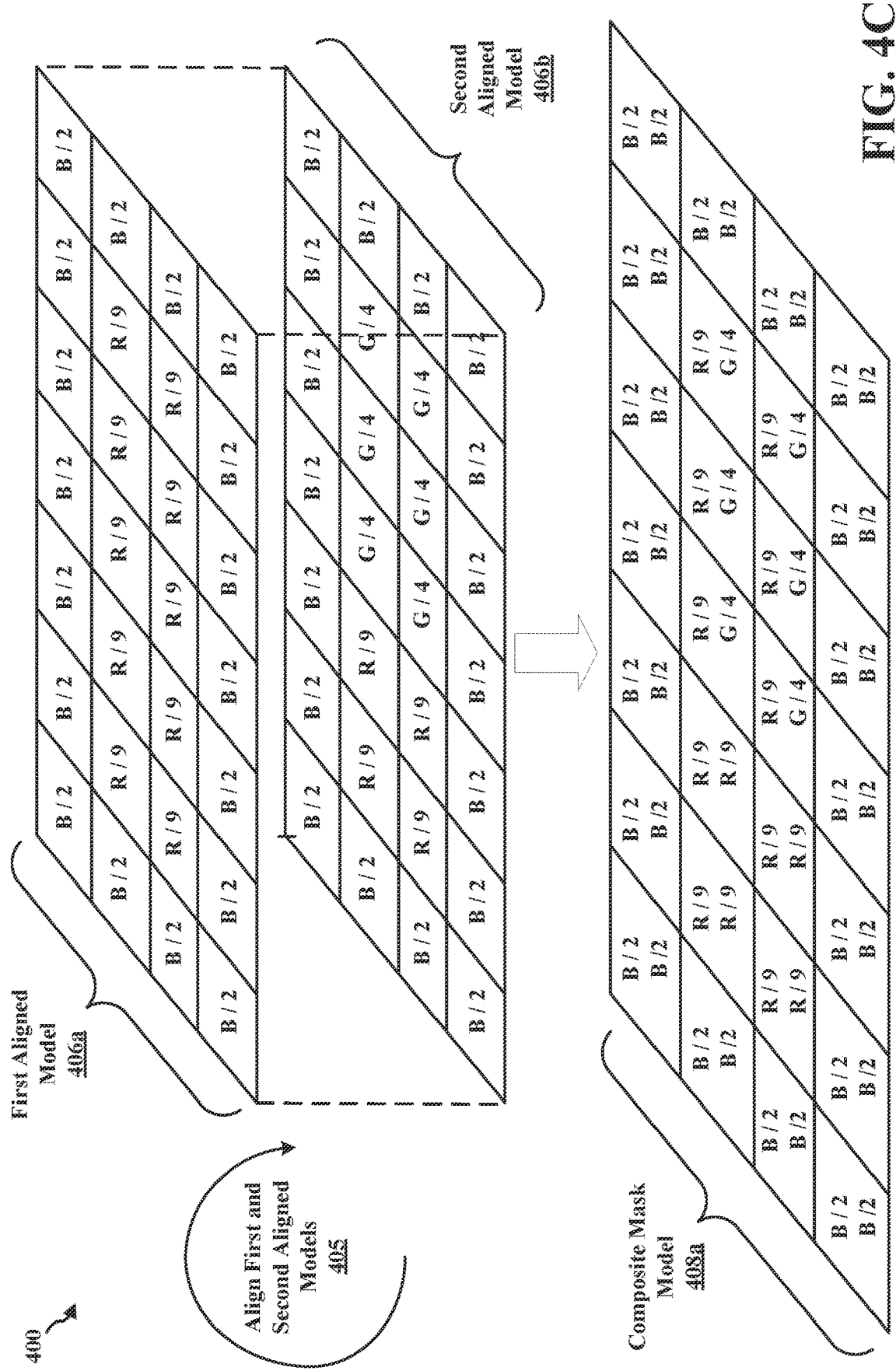

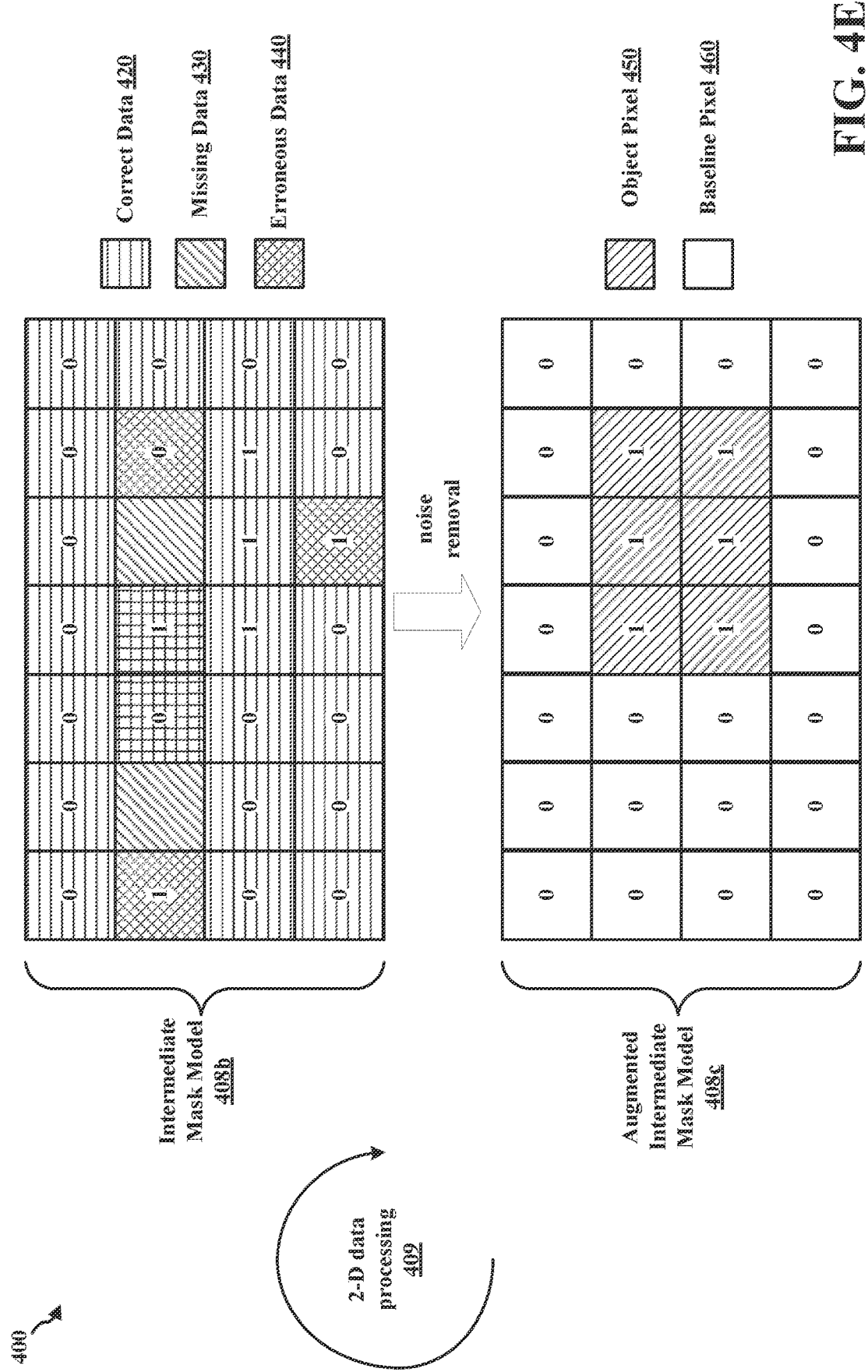

ROBOTIC PICKING SYSTEM AND METHOD OF USE

BACKGROUND

Field of the Art

The invention relates to an automated robotic picking system. More specifically, the invention relates to automated picking of objects that are randomly disposed within a selection area.

Discussion of the State of the Art

Robotics systems are commonly used in industrial applications to pick items from a picking area or a holding apparatus, such as, for example, a box, a bin, a tote, a conveyor belt, etc. These systems sometimes use a vision system to recognize objects that may be scattered throughout the picking area. In some instances, the vision system may identify certain data or characteristics about the objects within the picking area, such as, for example, one or more objects' size, shape, and relative and/or absolute position within the picking area, etc. These identified characteristics may be passed to the robotic system to enable a robot to perform a variety of tasks, including, for example, moving one or more objects, grasping objects, etc.

Robotic systems and/or vision systems, however, often break down or are unable to identify objects when they are fully or partially obscured by, for example, a bin wall, bin floor, or other parts of a bin, tote, bag, etc., wherein the one or more objects may be placed (the various holding apparatuses are hereinafter generally referred to as a "bin" for ease of use and reference. However, it should be understood that the use of "bin" is not intended to be limiting and the disclosure herein is not limited to a bin). The variety of different parts of a bin may obscure objects that are placed within the bin when viewed from one or more angles and/or perspectives and/or when approached from one or more angles and/or perspectives. For example, a robot may not be able to pick or grasp an object if a surface of the object is covered by the bin. Similarly, a robot may not be able to adequately access an object if the pathway to a picking surface is obstructed by, for example, another object or a bin wall, etc. Moreover, the vision system may provide false object characteristics or data if it cannot differentiate between an object's surface and the bin's surface. False object characteristic data may cause pick failures, improper placement, or improper object selection/movement, which can be expensive or costly to remediate.

In an effort to overcome these challenges, some use a 2D camera to differentiate between a bin and any object(s) contained therein. In such systems, an image of the object(s) and the bin (hereinafter also referred to as a composite image) may be subtracted from the image of an empty bin (hereinafter also referred to as a background image). However, 2D camera systems often fail if the object and the bin have the same color and/or the same intensity. In these instances, 2D system fail to differentiate between an object and a bin even if the geometric shape and size of the object is different from the bin's geometric shape/size.

Some vision systems include 3D camera systems in order to alleviate these difficulties. 3D camera systems measure depth data associated with a bin and/or an object. As such, 3D vision systems can measure a difference in depth between the background image and the composite image in order to differentiate between objects and bins even if they have similar color or intensity characteristics. However, 3D camera hardware is often significantly more expensive than conventional 2D camera hardware. Moreover, 3D data processing systems also raise a slew of new data processing challenges. For example, 3D data is often comprised of missing data because the method used to capture 3D camera systems cannot infer an appropriate depth. Moreover, 3D data often includes significant noise, which makes it much more difficult to process 3D data in real-time environments. Because of these challenges, 3D processing techniques are still too failure prone to be used in a large scale, fast-moving industrial robotic systems. Moreover, because a 3D image is essentially a range image, it is computationally complex to process this data. Vision systems may not be able to process 3D data in the speed required for deployment in large scale, high-throughput industrial applications without significant computation resources, which can often be cost prohibitive.

Currently, no available system is able to accurately identify objects that are scattered within a bin with sufficient speed and accuracy—and with reasonable costs—for deployment in high-speed industrial picking systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The invention disclosed herein overcomes many of the issues outlined above by using 2D and 3D data in combination to identify correctly identify one or more objects that may be scattered in a bin. The use of 3D data alleviates color and pixel intensity issues that typically plague 2D vision system. In other words, the 3D data may be used to differentiate between an object and a bin even if they have a same or similar color or pixel intensity. In addition, the data processing techniques disclosed herein enable the system to align the 3D data to the same coordinate system or viewpoint as the obtained 2D data, which enables faster data processing and enables the system to use the data in a real-time or near-real-time high-speed industrial picking system without using expensive computing and/or processing equipment. An additional benefit of the system disclosed herein is the it enables the use of 3D camera hardware that is generally significantly less expensive than sophisticated 3D depth cameras that are required in conventional 3D vision systems (generally the more expensive cameras tend to obtain information that cheaper cameras are unable to obtain). As such, the invention of the present disclosure enables an improved and a more cost effective system for identifying objects that may be scattered in a bin More specifically, the present disclosure enables faster data processing that uses fewer compute resources by generating a binary intermediate mask model. Generally, it is much faster—and also computationally efficient—to remove noise from a binary intermediate mask than from 3D data alone. The binary intermediate mask may be augmented to fill-in any missing data and/or correct erroneous data points that, if left un-filled or un-corrected, could potentially lead to erroneous results. Generally, and as described herein, it is much faster—and computationally efficient—to fill and correct data in a binary intermediate mask model than in 3D data. As such, the present invention makes it feasible, and cost effective—in terms of hardware costs associated with 3D camera systems and in terms of computing costs—to use 2D and 3D data in a real-time or near-real-time robotic picking systems that are deployed in industrial, high-throughput systems.

The process of generating a binary intermediate mask and an augmented intermediate mask is described in greater detail throughout the specification, but generally, the models are generated by first aligning various 2D and 3D data points. For example, 2D data and 3D data that is captured by 2D cameras and 3D cameras may be obtained for background scenes (representing an empty bin, for example), and composite scenes (representing a bin with one or more objects scattered within the bin). The 2D and 3D image(s) for each background scene and composite scene may be aligned to the same viewpoint to enable faster processing without having to compute for complex geometry, which (computing for complex geometry) generally makes the downstream processing significantly more complex and computationally inefficient. In one embodiment, the 2D and 3D images are aligned at a pixel-by-pixel level to output a first aligned model for the background image and a second aligned model for the composite image. The two model may be compared to identify pixels in the second aligned model that may be associated with one or more objects that may be scattered in a bin. For example, the pixel(s) in the second aligned model that include 2-D image data and/or 3-D image data that differs from that image data included in the corresponding pixel in the first aligned model may be identified as a foreground pixel (e.g., associated with a foreground object). This comparison process enables the generation of the intermediate mask model that includes foreground pixels that are assigned a first value (e.g., 1) and background pixels that are assigned a second value (e.g., 0).

Because the intermediate mask model is binary—and because the 3D model is aligned to the 2D model at a pixel level-2D image processing techniques may be employed to augment the intermediate mask model to, for example, remove noise, correct erroneous data, and fill-in missing data. This is advantageous because 2D processing techniques require fewer compute resources and may be executed more quickly, which makes them suitable for deployment in real-time or near-real-time high-speed robotic system that is not prohibitively expensive. A variety of 2D data processing techniques may be used, including, but not limited to erosion and dilation to remove noise, as well as other techniques to correct erroneous data and/or fill-in missing data. In this manner, the data may be augmented.

Once the augmentation steps are complete, a foreground image (i.e. an image of only an object—that is separate from the bin that the object is placed in) may be generated. In one embodiment, the pixels in the second aligned model that correspond to pixels in the augmented intermediate mask model may be identified as foreground pixels (by being assigned a value of, for example, 1). In one embodiment, 2D and/or 3D pixels from the second aligned model that correspond to the identified foreground pixels may be identified and retrieved to generate a 2D and/or 3D image that represents the object by itself (i.e. without the bin).

More specifically, in an aspect of the disclosure, a method, a computer-readable medium, and an apparatus are provided. The apparatus may obtain one or more first 2D image data and one or more ore more first 3D data. In certain aspects, the one or more first 2D image data and the one or more 3D data may correspond to a first scene. The apparatus may generate a first aligned model by aligning the one or more first 2D image data and the one or more first 3D data. The apparatus may also obtain a second 2D image data and a second 3D data, the second 2D image data and the second 3D data corresponding to a second scene. The apparatus may generate a second aligned model by aligning the second 2D image data and the second 3D data. The apparatus may generate a composite model by aligning the first aligned model and the second aligned model to a frame. The apparatus may generate an intermediate mask model from the composite model by comparing the one or more first 2D image data to the second 2D image data and by comparing the one or more first 3D data to the second 3D data. The apparatus may augment the intermediate mask model by applying 2D image processing techniques to the intermediate mask model. The apparatus may generate a 2D object image data and a 3D object image data by applying the augmented mask model to the second 2D image data and the second 3D data. In certain aspects, the 2D object image data and the 3D object image data may identify one or more objects associated with the second 2D image data and the second 3D data and that are not associated with the one or more first 2D image data and the one or more first 3D data.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

FIG. 4C illustrates an operation that may be performed by a vision system in accordance with certain aspects of the disclosure.

FIG. 4E illustrates an operation that may be performed by a vision system in accordance with certain aspects of the disclosure.

Figure 5A:
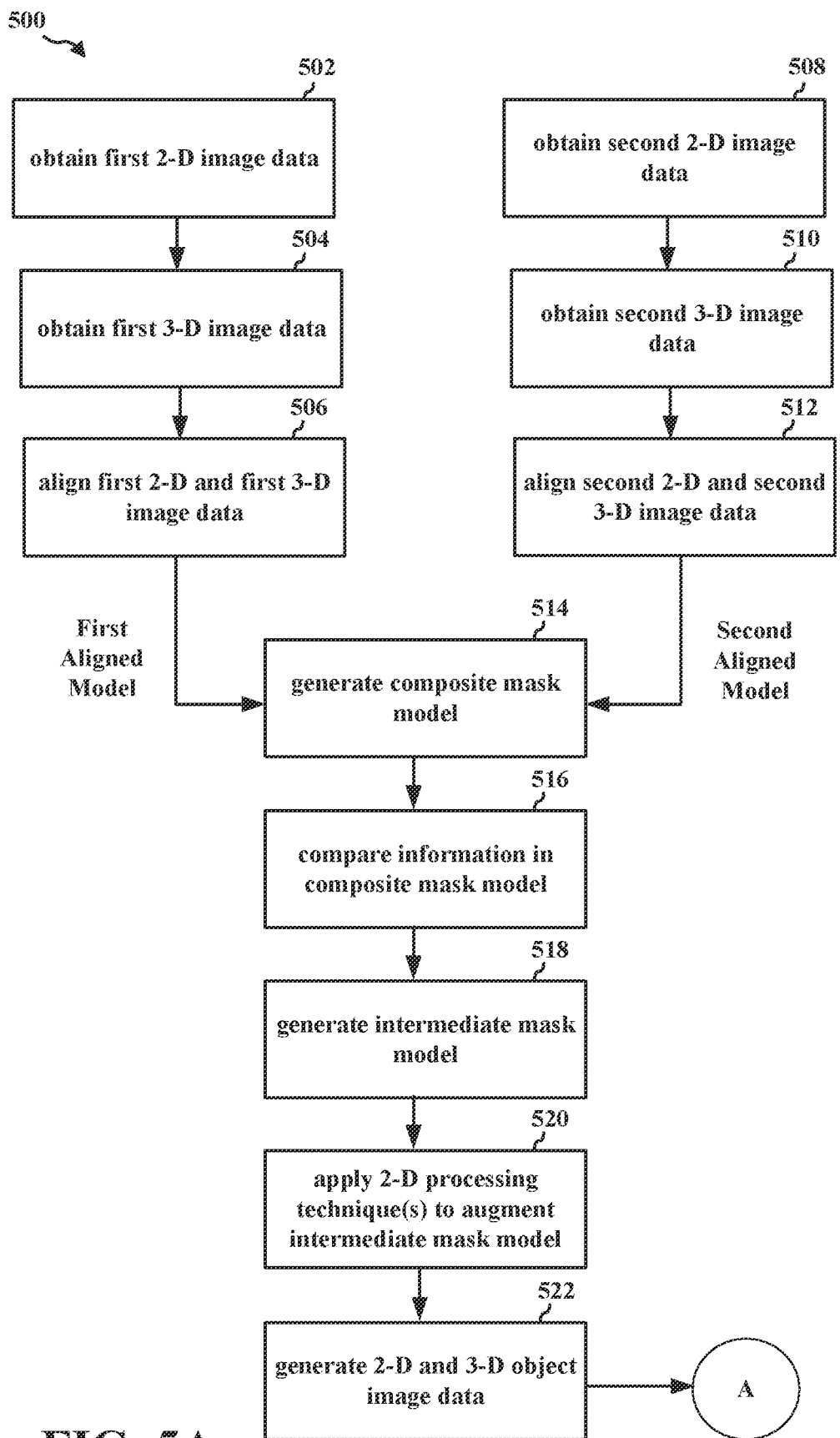
FIG. 5A illustrates a flowchart for identifying 2D object image data and 3D object image data in accordance with certain aspects of the disclosure.
Figure 5B:
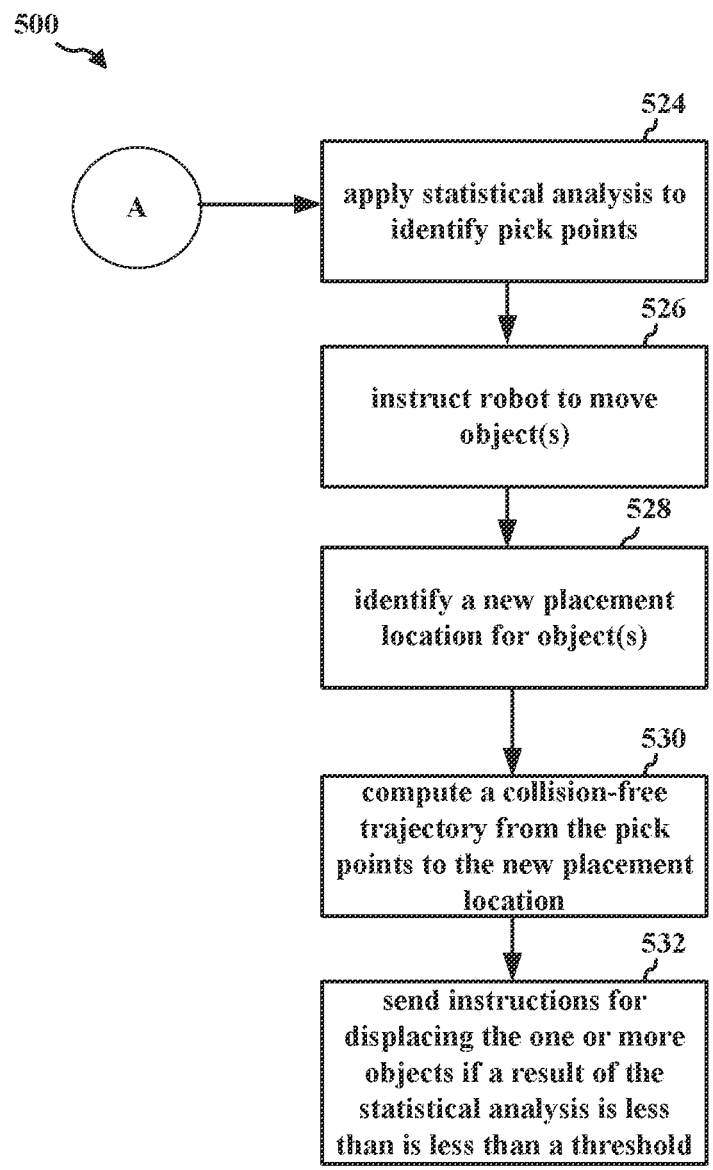

FIG. 5B illustratess a flowchart for identifying 2D object image data and 3D object image data in accordance with certain aspects of the disclosure.

Figure 6:
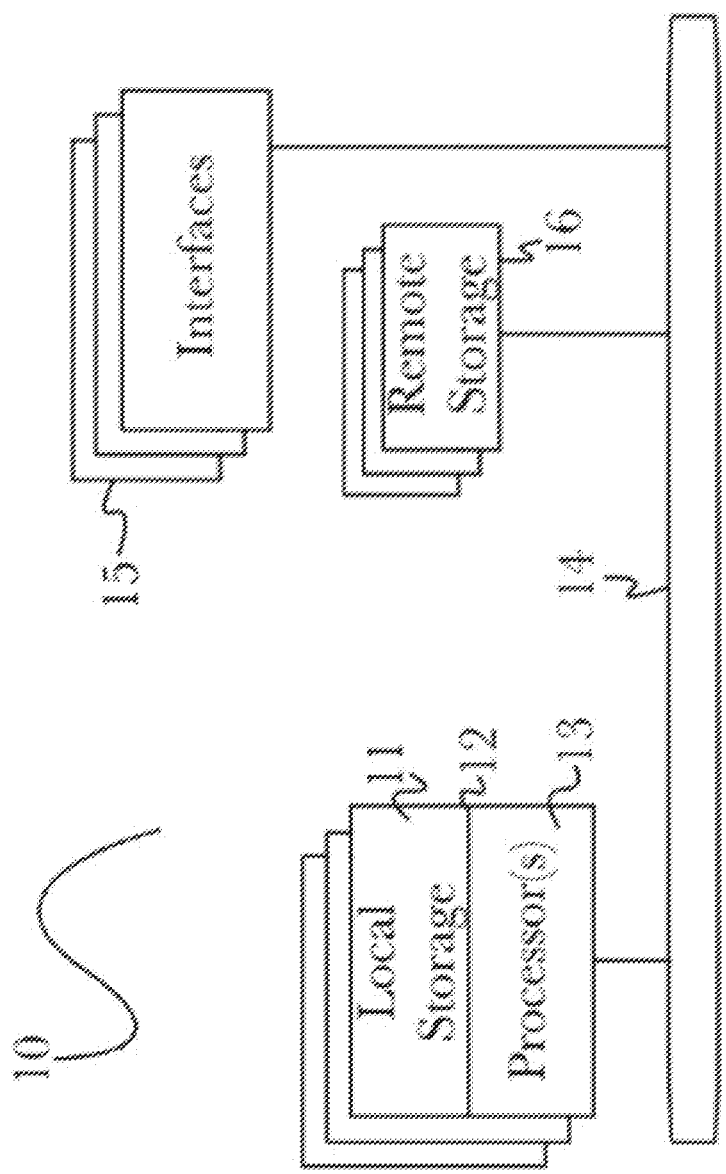

FIG. 6 illustrates one embodiment of components of an example machine able to read instructions from a machine-readable medium and execute them in a processor (or controller) in accordance with certain aspects of the disclosure.

Figure 7:
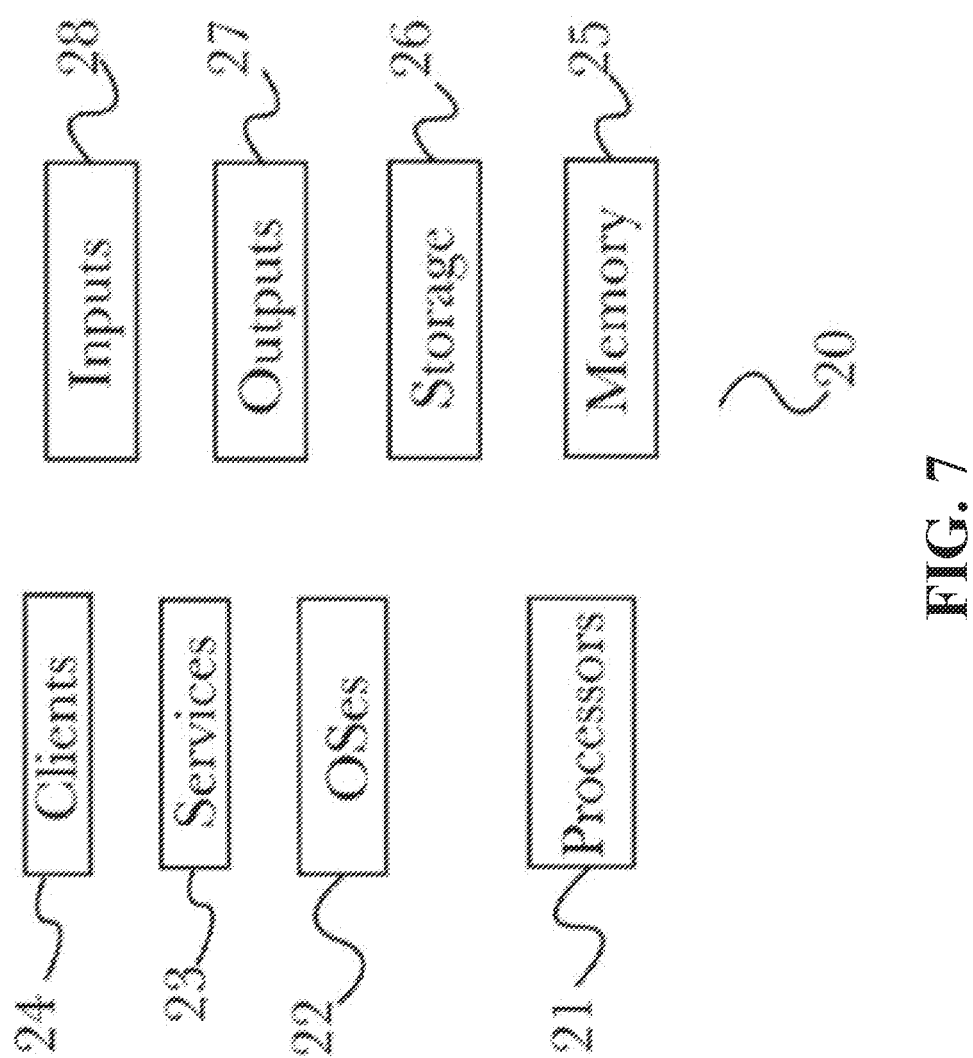

FIG. 7 illustrates on embodiment of the computing architecture that supports an embodiment in accordance with certain aspects of the disclosure.

Figure 8:
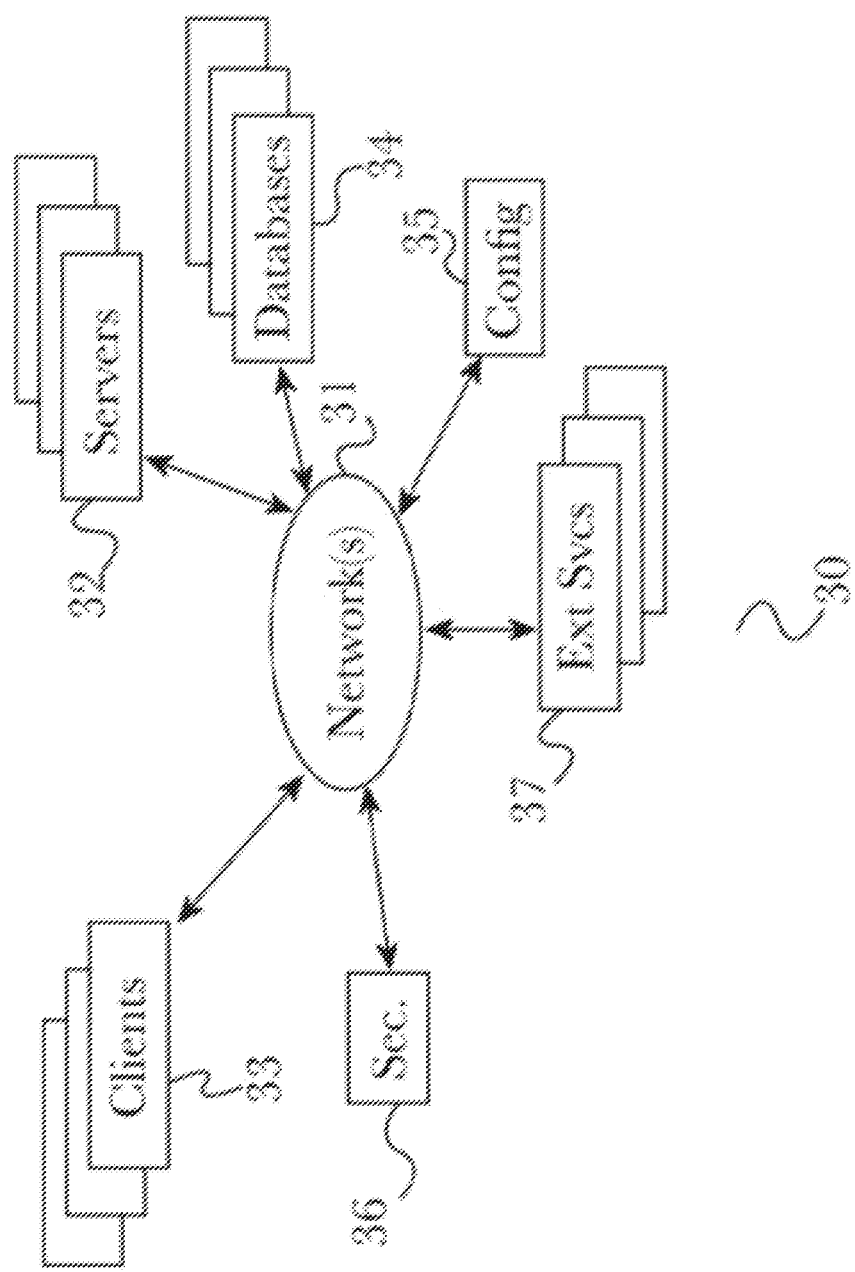

FIG. 8 illustrates components of a system architecture that supports an embodiment in accordance with certain aspects of the disclosure.

Figure 9:
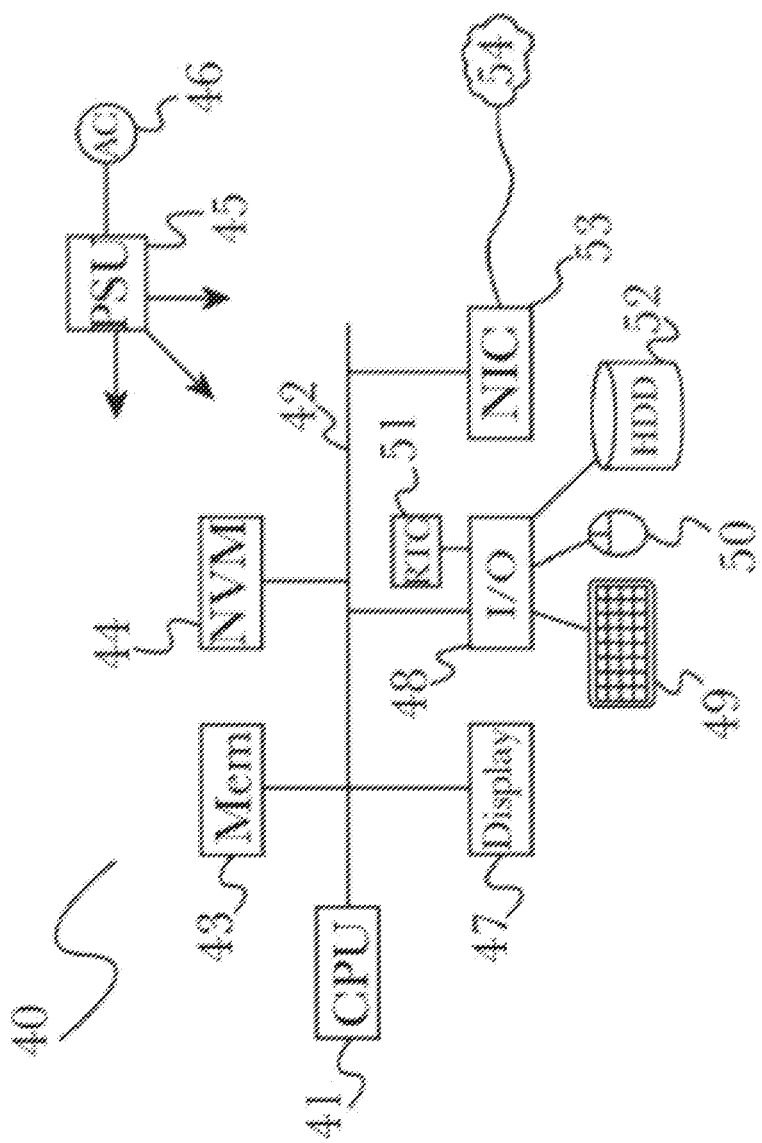

FIG. 9 illustrates components of a computing device that supports an embodiment in accordance with certain aspects of the disclosure.

DETAILED DESCRIPTION

The inventive system and method (hereinafter sometimes referred to more simply as "system" or "method") described herein significantly reduces the computing resources, computing time, and costs associated with identifying foreground object(s) to be picked up using a fast-moving industrial picking system. Specifically, the inventive system is capable of removing noise from a dataset that includes both the 2D and 3D image using only 2D data processing technique(s), which significantly reduces the computing resources, computing time, and costs as compared to conventional vision systems that require 3D data processing techniques to remove noise from 3D data. The technique(s) employed by the inventive system that enable noise removal using only 2D data processing techniques will now be described.

For example, the inventive system may organize background 2D and 3D data by pixel into a background pixel map. As described herein, the background pixel map may also be referred to as a "first aligned model." Furthermore, the inventive system may organize component 2D and 3D data by pixel into a component pixel map. As described herein, the component pixel map may also be referred to as a "second aligned model."

The inventive system may perform a pixel-by-pixel comparison of the background pixel map and the component pixel map to identify pixels that differ from the background pixel map to the component pixel map. The difference may be identified, for example, when one or more of the 2D characteristics and/or 3D characteristics associated with a pixel have changed a threshold amount between the background pixel map and the component pixel map.

Next, the inventive system may generate an intermediate mask model that indicates which pixels in the component pixel map are different than those in the background pixel map and which pixels remain the same. In certain configurations of the intermediate mask model, the pixels that are the same may be assigned a first value (e.g., '0') and the pixels that differ may be assigned a second value (e.g., '1'). Hence, the intermediate mask model includes a binary map that may be used to identify pixels associated with foreground object(s) to be moved. For example, the pixels assigned a value of '1' may be associated with a foreground object.

In one embodiment, the erroneous and/or missing data in the intermediate mask model is removed using 2D data processing technique(s). The corrected intermediate mask model may be referred to herein as an "augmented intermediate mask model." In certain non-limiting implementations, the 2D data processing may include erosion and/or dilation processing techniques.

By processing the data in this way (i.e. by using 2D data processing technique(s) instead of 3D data processing technique(s) and/or a combination of 2D and 3D data processing techniques), the present invention is enabled to correct significant defects that would otherwise make the combined images inoperable while, at the same time, significantly reducing the compute resources required to process the data. As such, the inventive concepts are particularly useful in robotics picking systems that require high throughput, fast decisioning, low error rates, and reduced costs. Indeed, the inventive system provides a useful and significant improvement over conventional systems that either do not employ 3D cameras or conventional systems that employ 3D cameras that require the use of 3D data processing technique(s) to correct defects in the 3D dataset.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

Conceptual Architecture

Figure 1:
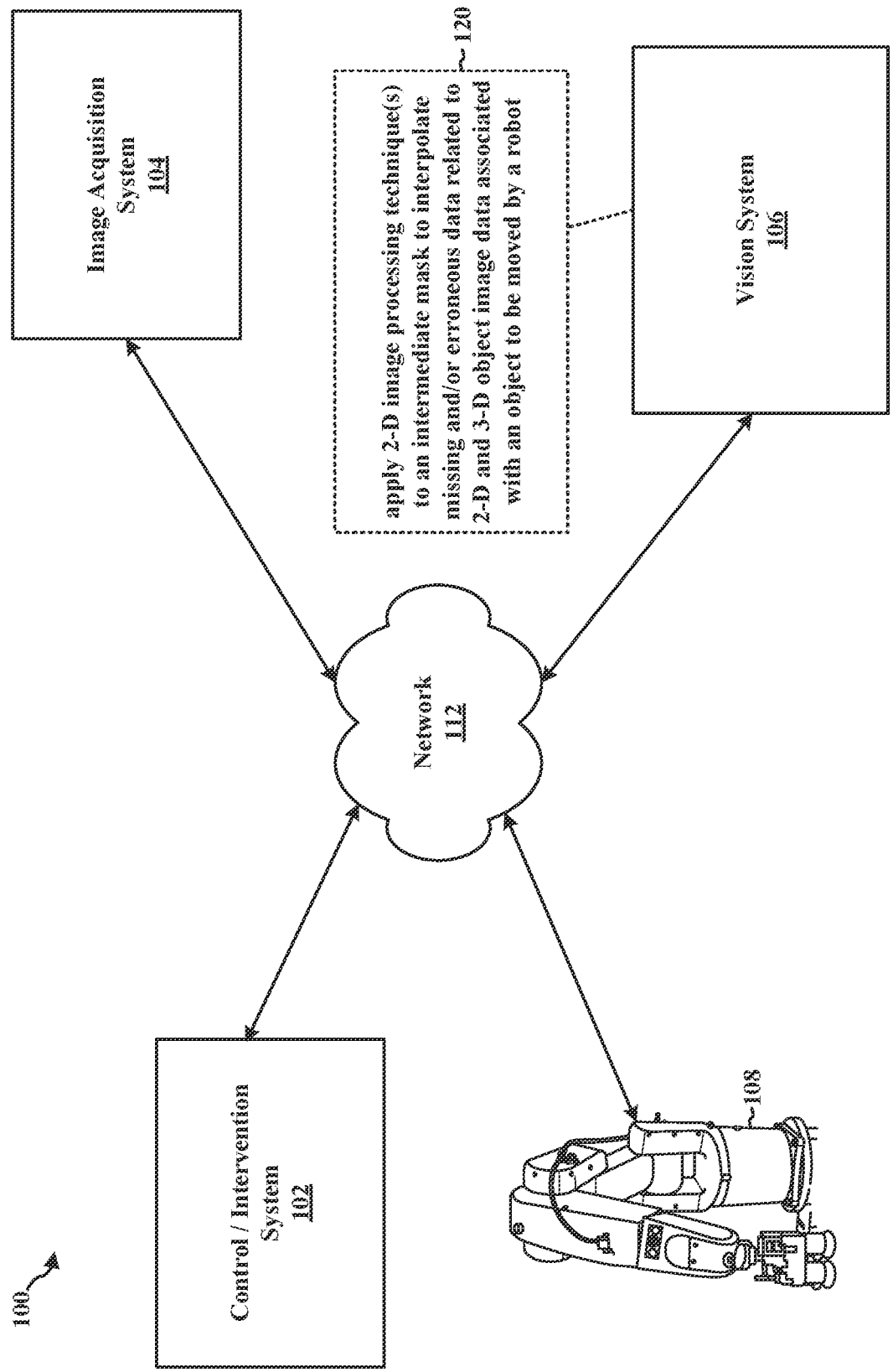
FIG. 1 is a diagram illustrating an example operating environment in accordance with certain aspects of the disclosure.

FIG. 1 illustrates a block diagram of an example operating environment 100 in accordance with certain aspects of the disclosure. As seen in FIG. 1, the example operating environment 100 may include a control/intervention system 102, an image acquisition system 104, a vision system 106, a robotics system 108, and a network 110. The control/intervention system 102, the image acquisition system 104, the vision system 106, and the robotics system 108 may be connected via a network 110. The network 110 may be capable of transporting messages between devices within the example operating environment 100. It is noted that multiple instances of the disclosed systems and sub-systems may be present in various embodiments, and that references herein to a system or a sub-system generally refers to one or more of the systems or sub-systems. In an alternative embodiment, the functionalities of multiple agents may be merged, modified, or split into a functionally equivalent set of systems and sub-systems. The various computing agents may comprise one or more computing devices, like the computing device 10 illustrated in FIG. 6 and/or the computer system 40 illustrated in FIG. 9.

Each of the control/intervention system 102, the image acquisition system 104, the vision system 106, and the robotics system 108 may include suitable logic, circuitry, interfaces, processors, and/or code that may be used for communications with the other devices within the example operating environment 100 via the network 110. For example, communications within the example operating environment 100 may be implemented using a wireless communication protocol (e.g., FlashLinQ, WiMedia, Bluetooth®, ZigBee®, Wi-Fi based on the IEEE 802.11 standard, Long-Term Evolution (LTE), or 5G New Radio (NR), narrowband internet-of-things (NB IoT), etc.), a mix of different wireless communication protocols, an internet protocol, a wired communication protocol, or any combination thereof. In certain configurations, the network 110 may comprise any one or combination of a wired network, a wireless wide area network (WWAN), a wireless local area network (WLAN), or a wireless personal area network (WPAN). In certain configurations, at least a portion of the network 110 may be private. In certain other configurations, at least a portion of the network 110 may be public, e.g., such as the Internet.

In certain implementations, the control/intervention system 102 may initiate operations associated with identifying foreground objects to be picked by the robotics system 108. In one embodiment, the control/intervention system 102 may be monitored by a human operator who may or may not be remote from the robotic system. In one embodiment, the control/intervention system 102 may be used to identify a first scene (e.g., an empty bin) and a second scene (e.g., the bin with one or more objects located therein). More specifically, the control/intervention system 102 may instruct the image acquisition system 104 (e.g., a two-dimensional (2D) camera system and/or a three-dimensional (3D) camera system, etc.) to obtain first 2D image data and/or first 3D data associated with a first scene. In certain non-limiting examples, the first scene may include an empty bin, an empty palette, an empty conveyor, etc. In certain other implementations, the control/intervention system 102 may instruct the image acquisition system 104 to obtain second 2D image data and/or second 3D data associated with a second scene. In certain non-limiting examples, the second scene image may include a bin with one or more objects located therein, a palette with one or more objects located thereon, a conveyor with one or more objects located thereon, etc. In certain configurations, the control/intervention system 102 may send a signal, via the network 110, instructing the image acquisition system 104 to obtain one or more of the first 2D image data, the first 3D data, the second 2D image data, and/or the second 3D data. The control/intervention system 102 may include at least one computing device, e.g., such as the computing device 10 illustrated in FIG. 6 and/or the computer system 40 illustrated in FIG. 9.

The image acquisition system 104 may be used to acquire 2D and/or 3D data associated with one or more scenes. In certain configurations, the image acquisition system 104 may include a 2D camera system (comprising, for example, one or more 2D cameras) that is configured to obtain 2D image data of a first scene (e.g., an empty bin) and/or a second scene (e.g., the bin with one or more objects located therein). In certain implementations, the 2D camera system may obtain one or more first 2D image data that may be obtained of the first scene and/or a second 2D image data that may be associated with the second scene. The first 2D image data and the second 2D image data may be comprised of one or more 2D image parameters, including, but not limited to, color model information, noise information, sharpness measure or information, white balance or color balance information, etc. By way of example and not limitation, a 2D color model information may include one or more of a red, green, and blue color model, a grayscale color model, a hue, saturation, brightness (HSB) color model, a hue, saturation, lightness (HSL) color model, just to name a few. As described in greater detail below, the color model information may be used to identify a color of a pixel, or more generally, may be used to determine whether a pixel represents data captured from a first scene or a second scene. In at least one embodiment, the image acquisition system 104 may include at least one computing device, e.g., such as the computing device 10 illustrated in FIG. 6 and/or the computer system 40 illustrated in FIG. 9.

The image acquisition system 104 may also include a 3D camera system (comprising, for example, one or more 3D cameras) that is configured to obtain information about the external surface of items that are within the camera's field of view. In one embodiment, the 3D camera(s) may be used to generate a three-dimensional point cloud that measures many points on the external surface of objects within the camera(s)' field of view. In one embodiment, the 3D camera may be positioned such that the 3D camera's field of view overlaps the 2D camera's field of view with respect to at least one data point. In one embodiment, the 3D cameras may be used, for example, to obtain a 3D representation of the first scene (e.g., empty bin) and/or the second scene (e.g., bin with object(s) located therein). For example, the 3D camera system may obtain one or more first 3D data of the first scene and/or a second 3D data of the second scene. In a non-limiting example, the one or more first 3D data and the second 3D data may be comprised of depth data or range data. In certain examples, the 3D camera system may capture a 3D image or representation of a scene. The 3D image may be comprised of a grid of pixels. Each pixel may correspond to a surface area of the scene (or an object within the scene). The 3D data for a pixel may comprise a value that is correlated to the distance of its corresponding surface area in the scene to the 3D camera system or another fixed point.

The image acquisition system 104 may send the one or more first 2D image data, the one or more first 3D data, the second 2D image data, and/or second 3D data to the vision system 106 via the network 110.

In one embodiment, the one or more first 2D image data and/or the one or more first 3D data may be input into an artificial intelligence (AI) and/or machine learning (ML) engine (e.g., background image processor 203 in FIG. 2) in order to create a training dataset for the vision system 106 representing different ways in which the first scene may appear or be oriented. Enabled with a wider understanding of a first scene, the vision system 106 may be able to more accurately identify 2D data associated with a background object (e.g., a bin) when attempting to identify foreground object(s) in the second scene.

The vision system 106 may process the obtained 2D image data and/or 3D data to identify objects that may be scattered throughout a bin or a tote, a conveyor, etc. In one embodiment, the image processing data may be used to identify pick points for picking one or more objects and/or to singulate objects for further processing. The specifics of how the vision system 106 may process the 2D and/or 3D data is described in greater detail below in reference to FIGS. 2, 4A-4E, and 5A. But generally, the vision system 106 generates a composite mask and an intermediate mask based on 2D and 3D data associated with a first scene and a second scene. The vision system 106 thereafter may apply 2D image processing technique(s) to augment the data and identify objects based on the augmented data. Pick points may be calculated based on the identified object data. The vision system 106 may send information associated with objects and/or pick points to the robotics system 108 via the network 110, wherein the robotics system 108 may enable a robot to pick or singulate objects for further processing. Additional details associated with the vision system 106 are described below, e.g., in connection with FIG. 2. The vision system 106 may include at least one computing device, e.g., such as the computing device 10 illustrated in FIG. 6 and/or the computer system 40 illustrated in FIG. 9.

The robotics system 108 may include at least one computing device, e.g., such as the computing device 10 illustrated in FIG. 6 and/or the computer system 40 illustrated in FIG. 9. The robot system 108 may include a robot that is configured to pick-up an object based at least in part on the information associated with the object(s) and/or pick points received from the vision system 106.

DETAILED DESCRIPTION OF EXEMPLARY EMBODIMENTS

Figure 2:
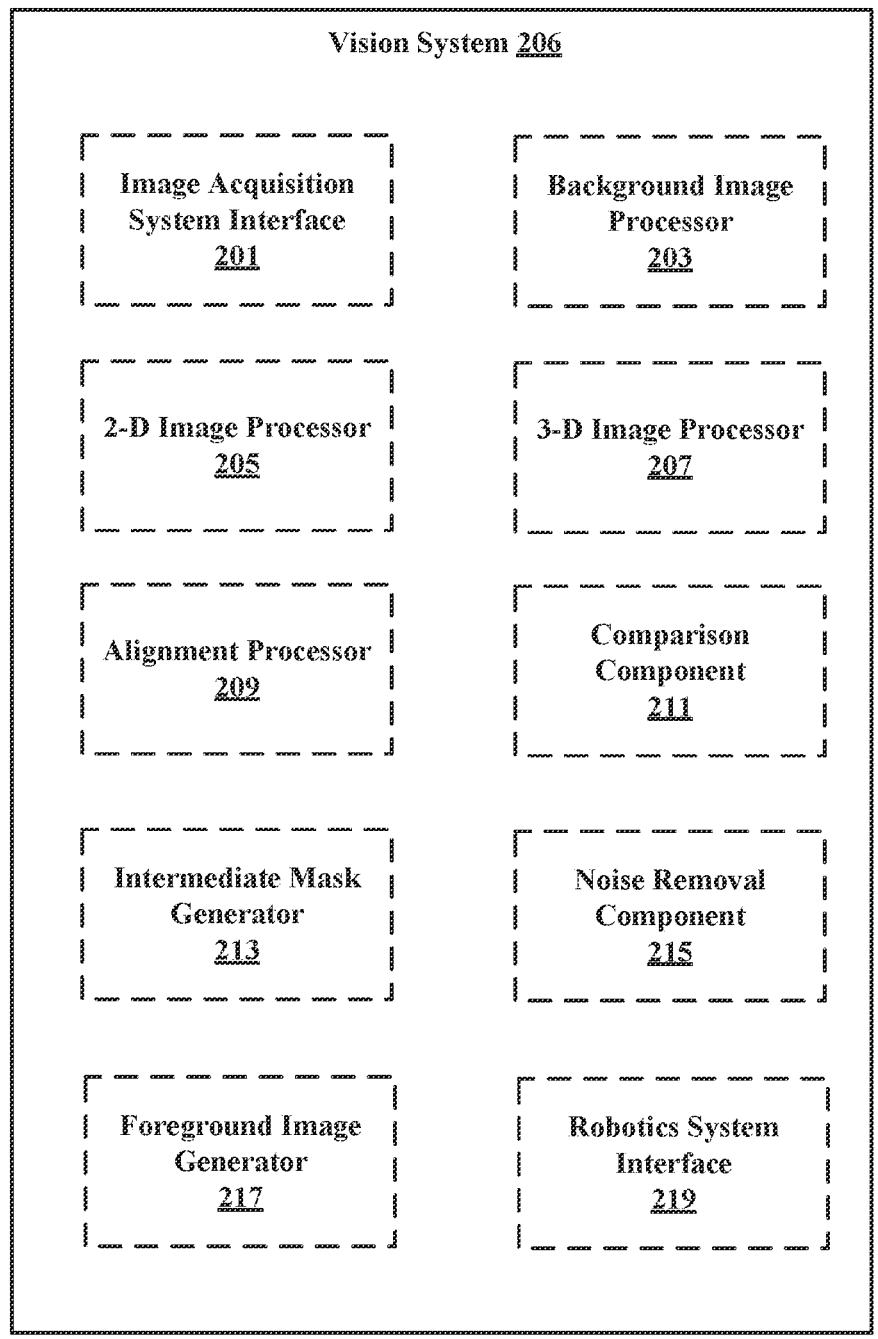
FIG. 2 is block diagram of a computing device in accordance with certain aspects of the disclosure.

FIG. 2 illustrates a block diagram 200 representing an exemplary vision system 206 in accordance with certain aspects of the present disclosure. The example vision system 206 may correspond to, e.g., the vision system 106, the computing device 10, and/or the computer system 40. In certain configurations, the example vision system 206 may comprise an image acquisition system interface 201, background image processor 203, 2D image processor 205, 3D image processor 207, alignment processor 209, comparison component 211, intermediate mask generator 213, noise removal component 215, foreground image generator 217, and robotics system interface 219.

The image acquisition system interface 201 may receive and/or otherwise obtain 2D and/or 3D data captured by an image acquisition system. The obtained data may be comprised of one or more first 2D image data of a first scene (e.g., color data of empty bin), one or more first 3D data of the first scene (e.g., depth data of empty bin), second 2D image data of a second scene (e.g., color data of bin with objects located therein), and second 3D data of the second scene (e.g., depth data of bin with objects located therein) from, e.g., the image acquisition system 104 described above in connection with FIG. 1. In certain implementations, the 2D image data obtained by the image acquisition system interface 201 may include, e.g., a red, green, and blue color model, a grayscale color model, a HSB color model, and/or a HSL color model, just to name a few. In certain other implementations, the one or more first 3D data and/or second 3D data obtained by the image acquisition interface 201 may include, e.g., depth data or range data. The image acquisition system interface 201 may send the one or more first 2D image data and/or the one or more first 3D data of the first scene to the background image processor 203. The image acquisition system interface 201 may send the one or more first 2D image data and the second 2D image data of the second scene to the 2D image processor 205. The image acquisition system interface 201 may send the one or more first 3D data and the second 3D data of the second scene to the 3D image processor 207. The image acquisition system interface 201 may include at least one computing device, e.g., such as the computing device 10 illustrated in FIG. 6 and/or the computer system 40 illustrated in FIG. 9.

The background image processor 203 may maintain a first scene dataset (e.g., a plurality of 2D image data and 3D data associated with an empty bin). Moreover, the background image processor 203 may update the first scene dataset with new 2D image data and 3D data associated with a first scene as it is obtained from the image acquisition system 201. The background image processor 203 may perform a variety of different computations on the first scene dataset, which may be used to further process first scene data. For example, in one embodiment, the one or more first 2D image data and/or the one or more first 3D data may be input into an artificial intelligence (AI) and/or machine learning (ML) engine (e.g., background image processor 203 in FIG. 2) in order to train an AI or an ML classifier about the different ways in which the first scene may appear or be oriented. The training dataset as well as the trained classifier may be used to identify features or characteristics associated with a first scene (i.e. an empty bin). In some, but not all embodiments, if 2D or 3D data is obtained, it may first be processed by the background image processor 203 to determine whether it is associated with a first scene (i.e. an empty bin). By maintaining and updating a first scene dataset, the vision system 206 and/or the background image processor 203 of the present disclosure may be able to distinguish between background pixels and foreground pixels with higher accuracy than traditional systems. The background image processor 203 may include at least one computing device, e.g., such as the computing device 10 illustrated in FIG. 6 and/or the computer system 40 illustrated in FIG. 9.

The 2D image processor 205 processes 2D image data that is captured by the image acquisition system. In one embodiment, the 2D image processor 205 may identify and/or assign 2D data (e.g., color information) to each of the pixels in the one or more first 2D image data and/or second 2D image data captured by, e.g., the image acquisition system 106 (e.g., 2D camera(s)) described above in connection with FIG. 1. The 2D image processor 205 may include at least one computing device, e.g., such as the computing device 10 illustrated in FIG. 6 and/or the computer system 40 illustrated in FIG. 9.

The 3D image processor 207 may identify and/or assign 3D data (e.g., depth and/or distance data) associated with each of the pixels in the one or more first 3D data and/or second 3D data captured by, e.g., the image acquisition system 106 (e.g., 3D camera(s)) described above in connection with FIG. 1. In certain implementations, 3D data associated with certain pixel(s) may be missing due to the computational complexity and/or electric noise inherent when obtaining depth data. In scenarios in which 3D data may be missing from certain pixels, the 3D image processor 207 may be configured to interpolate the missing 3D data by assigning a value or term to those pixels with missing data. For example, the assigned value may be estimated and/or calculated from known 3D data from the pixels surrounding and/or near those pixels with missing data. In one embodiment, the 3D image processor 207 may include at least one computing device, e.g., such as the computing device 10 illustrated in FIG. 6 and/or the computer system 40 illustrated in FIG. 9.

The alignment processor 209 may generate a first aligned model by aligning the one or more first 2D image data and the one or more first 3D data. In certain implementations, the alignment processors 209 may align one or more first 2D image data and the one or more first 3D data by aligning first pixels in the one or more first 2D image data that overlap with second pixels in the one or more first 3D data. For example, when the image acquisition system 104 includes a 2D camera and a 3D camera positioned adjacent to one another, the one or more first 2D image data (e.g., 2D image) and the one or more first 3D data (e.g., 3D image) may be associated with two different but overlapping areas of the first scene. When the overlapping region of the first scene is identified, the alignment processor 209 may align the first pixels in the one or more first 2D image data that overlap with the second pixels in the one or more first 3D data to a frame that omits any non-overlapping pixels. The first alignment model may include a mapping of the 2D image data (e.g., color data) and the 3D data (e.g., depth data) to corresponding pixels associated with the first scene. Additional details associated with the first alignment model are described below, e.g., in connection with FIG. 4A. The alignment processor 209 may include at least one computing device, e.g., such as the computing device 10 illustrated in FIG. 6 and/or the computer system 40 illustrated in FIG. 9.

The alignment processor 209 may generate a second aligned model by aligning the second 2D image data and the second 3D data. In certain implementations, the alignment processor 209 may generate the second alignment model by aligning third pixels in the second 2D image data to fourth pixels in the second 3D data. For example, due to the positioning of the 2D camera and the 3D camera, the second 2D image data (e.g., 2D image) and the second 3D data (e.g., 3D image) may be associated with two different but overlapping areas of the second scene. When the overlapping region of the second scene is identified, the alignment processor 209 may align the third pixels in the second 2D image data that overlap with the fourth pixels in the second 3D data to a frame that omits any non-overlapping pixels. The second alignment model may include a mapping of the 2D image data (e.g., color data) and the 3D data (e.g., depth data) to corresponding pixels associated with second scene. Additional details associated with the second alignment model are described below, e.g., in connection with FIG. 4B.

The alignment processor 209 may generate a composite model by aligning the first aligned model and the second aligned model to a frame. In certain implementations, the composite model may include a mapping of the 2D data/3D data for each pixel in the first aligned model to the 2D data/3D data for the corresponding pixel in the second aligned model. Additional details associated with the composite model are described below, e.g., in connection with FIG. 4C.

The comparison component 211 may compare the first scene data to second scene data via the composite model. More specifically, in one embodiment, comparison component 211 may compare the one or more first 2D image data to the second 2D image data associated with corresponding pixels in the composite model. Similarly, the comparison component 211 may compare the one or more first 3D data to the second 3D data associated with corresponding pixels in the composite model. The comparison component 211 may generate a comparison dataset that compares the first 2D image data/second 2D image data and/or the first 3D data/second 3D data for each pixel. The comparison component 211 may send the comparison dataset to the intermediate mask generator 213. In one embodiment, the comparison component 211 may include at least one computing device, e.g., such as the computing device 10 illustrated in FIG. 6 and/or the computer system 40 illustrated in FIG. 9.

The intermediate mask generator 213 generates an intermediate mask by based on differences in the first scene and the second scene. In one embodiment, the intermediate mask generator 213 may generate an intermediate mask model from the composite model (and/or the comparison dataset) by determining variances in the one or more first 2D image data/the second 2D image data for each pixel in the composite model and/or by determining variances in the one or more first 3D data to the second 3D data for each pixel in the composite model. In certain implementations, when a variance in one or more of the first 2D image data/second 2D image data and/or the first 3D data/second 3D data associated with a pixel meets a threshold, the intermediate mask generator 213 may assign a first integer value (e.g., a 1) to that pixel. Otherwise, when the variance in one or more of the first 2D image data/second 2D image data and/or the first 3D data/second 3D data associated with a pixel does not meets a threshold, the intermediate mask generator 213 may assign a second integer value (e.g., 0) to that pixel. Hence, the intermediate mask generator 213 may generate an intermediate mask that includes integer values assigned to each of the pixels in the frame. The intermediate mask model may indicate which regions in the second scene may include an object in the foreground based on pixels, corresponding to those surface area segments in the second scene, are assigned the first integer value (e.g., 1). The intermediate mask generator 213 may send the intermediate mask model to the noise removal component 213. Additional details associated with the intermediate mask model are described below in connection with, e.g., FIG. 4D. The intermediate mask generator 213 may include at least one computing device, e.g., such as the computing device 10 illustrated in FIG. 6 and/or the computer system 40 illustrated in FIG. 9.

The noise removal component 215 may augment the intermediate mask model by applying 2D image processing techniques to the intermediate mask model. For example, the noise removal component 215 may apply erosion and/or dilation (e.g., 2D data processing techniques) to the intermediate mask model to correct any missing and/or erroneous data therein. The noise removal component 215 may send the augmented intermediate mask model to the foreground image generator 217. Additional details associated with the augmented intermediate mask model are described below, e.g., in connection with FIG. 4E. The noise removal component 215 may include at least one computing device, e.g., such as the computing device 10 illustrated in FIG. 6 and/or the computer system 40 illustrated in FIG. 9.

The foreground image generator may generate a 2D object image data and a 3D object image data by applying the augmented mask model to the second aligned model (e.g., second 2D image data and the second 3D data). For example, the foreground image generator 217 may identify foreground pixels associated with a foreground object as those pixels in the second aligned model that correspond to the pixels in the augmented intermediate mask model that are assigned the first integer value. The foreground image generator 217 may generate the foreground image based at least in part on the second 2D image data and the second 3D data associated with the foreground pixels. Additional details associated with generating the foreground image are described below, e.g., in connection with FIG. 4F. The foreground image generator 217 may include at least one computing device, e.g., such as the computing device 10 illustrated in FIG. 6 and/or the computer system 40 illustrated in FIG. 9.

The robotics system interface 219 may obtain the 2D object image data and 3D object image data from the foreground image generator. In certain implementations, the robotics system interface 219 may send the 2D object image data and the 3D object image data to, e.g., the robotics system 108 described above in connection with FIG. 1. The robotics system interface 219 may include at least one computing device, e.g., such as the computing device 10 illustrated in FIG. 6 and/or the computer system 40 illustrated in FIG. 9.

Referring again to FIG. 1, the control/intervention system 102 may apply statistical analysis to identify pick points for picking the one or more objects identified in the 2D object image data and the 3D object image data. A variety of statistical analysis systems may be used in accordance with this disclosure and as would be apparent to a person of ordinary skill in the art. In one embodiment, the statistical analysis may be comprised of processing the 3D data (i.e. 3D data associated with a first scene, 3D data associated with a second scene, and/or 3D data associated with object data) to identify a surface area that can be used by a robotic picking system for picking the object, singulating it, etc. Additional statistical analysis may be performed on the identified one or more surface areas based on 3D bound limitations and/or angle boundaries to identify pick points for picking the one or more objects identified in the 2D object data. Moreover, statistical analysis may also provide a confidence score or a likelihood score which may be associated with each one or more identified pick points. The confidence score or likelihood score may be based on one or more parameters associated with the pick point statistical analysis. In one embodiment, the pick points associated with the highest confidence score or a threshold confidence score may be used to provide instructions to the robotics system 108. If no pick points are identified by the control/intervention system 102, the system may iterate through the entire 3D point cloud (i.e. 3D data associated with a first scene, 3D data associated with a second scene, and/or 3D data associated with object data) to identify any surface that the robotic system can grab to displace one or more objects in the container/bin/tote, etc. The identified surface for displacement may be analyzed to ensure that it does not violate angle conditions within the 3D bounded region and/or without colliding with one or more objects and/or container/bin/tote, etc. that the object may be placed within. Once the objects are displaced, second 2D data or second 3D data may be obtained again and the process may run in accordance with the disclosure herein to identify objects in the container/bin/tote, etc. In another embodiment of the invention, if insufficient pick points are returned, then the control/intervention system 102 may provide a recommendation to displace one or more items in the container/bin/tote, etc. (and/or to agitate the container/bin/tote, etc. and/or to stir the objects in the container/bin/tote, etc.).

In certain implementations, the control/intervention system 102 may identify a new placement location for the one or more objects identified in the 2D object image data and the 3D object image data. In such implementations, the control/intervention system 102 may compute a collision-free trajectory from the pick points to the new placement location.

In certain other implementations, the control/intervention system 102 may send instructions (e.g., to the robotics system 108) for displacing the one or more objects if a result of the statistical analysis is less than is less than a threshold. In such implementations, the instructions for displacing the one or more objects comprise one or more of agitating or stirring the one or more objects.

Figure 3A:
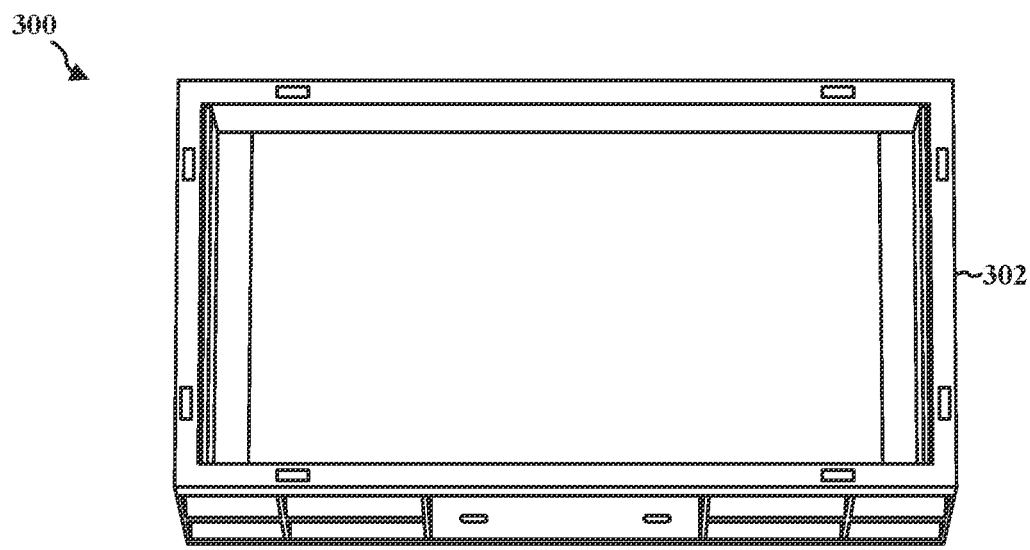
FIG. 3A illustrates a first scene in accordance with certain aspects of the disclosure.

FIG. 3A includes an illustration 300 of an exemplary first scene for which one or more first 2D image data and one or more first 3D data may be obtained in accordance with certain aspects of the present disclosure. The exemplary first scene may include, e.g., a bin 302. Although the exemplary first scene illustrated in FIG. 3A includes a bin 302, the first scene may include any type of container, conveyor, or stationary surface without departing from the scope of the present disclosure. One or more first 2D image data and one or more first 3D data of the first scene (e.g., the bin 302) may be obtained by, e.g., the image acquisition system 104 described above in connection with FIG. 1.

Figure 3B:
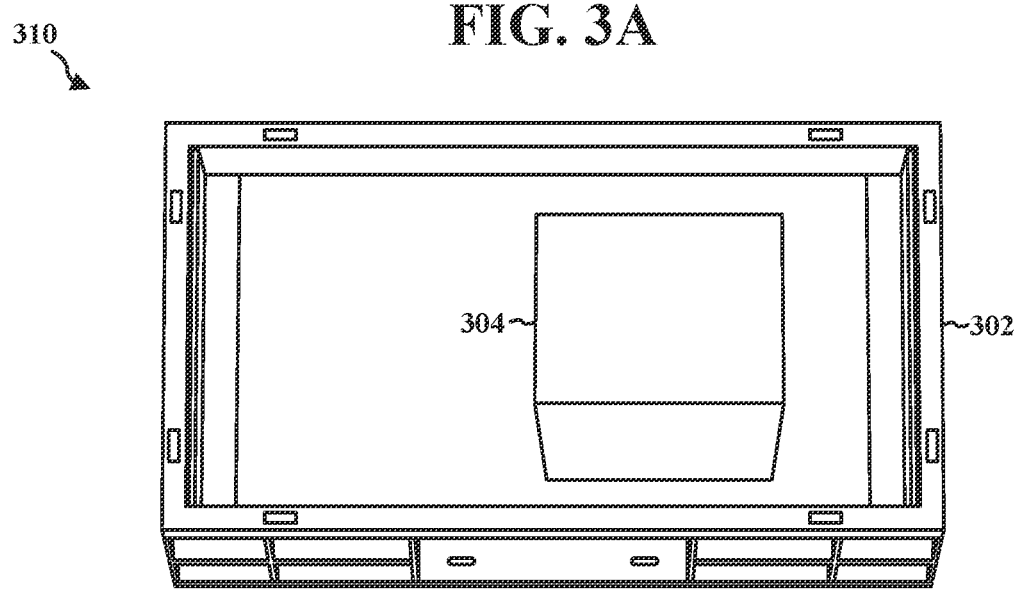
FIG. 3B illustrates a second scene in accordance with certain aspects of the invention.

FIG. 3B includes an illustration 310 of an exemplary second scene for which second 3D data and second 3D data may be obtained in accordance with certain aspects of the present disclosure. The exemplary second scene may include, e.g., a bin 302 with an object 304 located therein. Although the exemplary second scene illustrated in FIG. 3B includes a bin 302 with an object 304, the second scene may include any type of container, conveyor, or stationary surface with any number of volumetric objects located therein and/or thereon without departing from the scope of the present disclosure. The object(s) may include a plurality of objects of different sizes and/or shapes without departing from the scope of the present disclosure. Second 2D image data and second 3D data associated with the second scene (e.g., the bin 302 and the object 304) may be obtained by, e.g., the image acquisition system 104 described above in connection with FIG. 1.

Figure 3C:
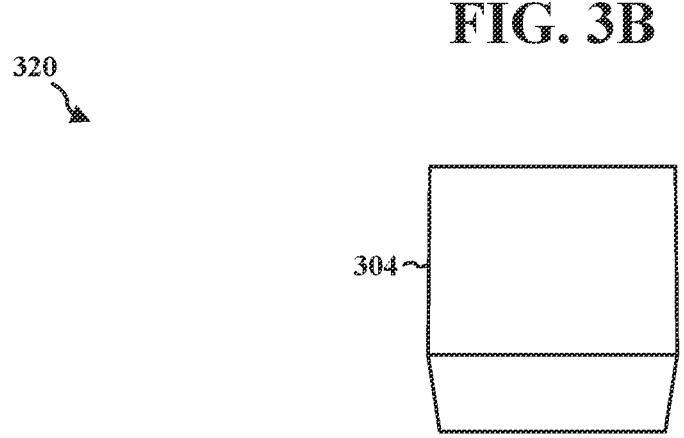
FIG. 3C illustrates a foreground object in accordance with certain aspects of the disclosure.

FIG. 3C includes an illustration 320 of an example object 304 for which 2D image object data and 3D image object data may be obtained in accordance with certain aspects of the present disclosure. In certain implementations, the 2D image object data and the 3D image object data for the example object 304 may be obtained by applying, e.g., 2D data processing technique(s) to the one or more first 2D image data, the one or more first 3D data, the second 2D image data, and the second 3D data. Additional details of obtaining the 2D image object data and the 3D image object data are described below, e.g., in connection with FIGS. 4A-4E. The vision system 106, 206 described above in connection with FIGS. 1 and 2, may be used to obtain the 2D image object data and the 3-image object data. Additional details associated with the technique(s) used to obtain the 2D image object data and the 3D image object data are described below, e.g., in connection with FIGS. 4A-4E.

FIGS. 4A-4E illustrate a dataflow 400 for generating 2D image object data and 3D image object data using 2D data processing technique(s) applied to an intermediate mask in accordance with certain aspects of the present disclosure. In certain implementations, operations associated with the data flow 400 may be performed by a vision system (e.g., the vision system 106, 206). For simplicity, each of the first 2D image data 402a, first 3D data 404a, first aligned model 406a, second 2D image data 402b, second 3D data 404b, second aligned model 406b, composite mask model 408a, intermediate mask model 408b, and augmented intermediate mask model 408c are described as having twenty-eight pixels organized a grid of four rows (e.g., row 1, row 2, row 3, row 4) and seven columns (e.g., column 1, column 2, column 3, column 4, column 5, column 6, column 7). However, it is understood by one of ordinary skill in the art that the 2D image data, 3D data, aligned models, and mask models may be comprised of any number of pixels that are organized in any number of rows and columns without departing from the scope of the present disclosure.

Figure 4A:
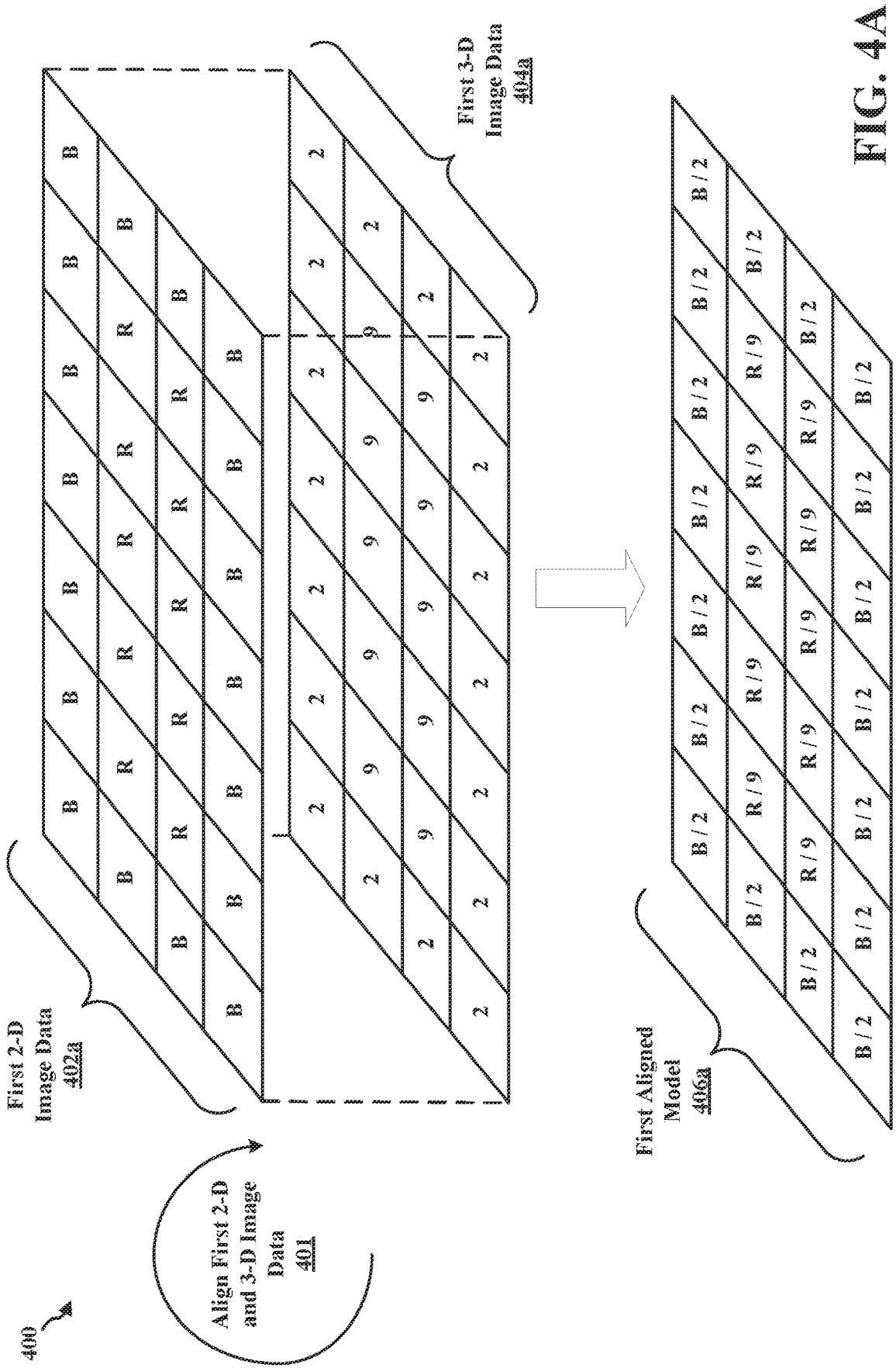
FIG. 4A illustrates an operation that may be performed by a vision system in accordance with certain aspects of the disclosure.

Referring to FIG. 4A, the vision system may obtain one or more first 2D image data 402a of a first scene (e.g. the first scene described above in connection with FIG. 3A). The first 2D image data 402a may be comprised of a plurality of different 2D characteristics assigned to each of plurality of pixels. The different 2D characteristics assigned to each pixel may represent a color model, e.g., such as a RGB color model, a grayscale color model, a HSB color model, or a HSL color model, just to name a few. In the particular example illustrated in FIG. 4A, the first 2D image data 402a is comprised of a RGB color model, but it not limited thereto.

An example technique for obtaining the first 2D image data will now be described with reference to FIG. 1. For example, the control/intervention system 102 may instruct the image acquisition system 104, which includes a 2D camera, to obtain 2D image data (e.g., first 2D image data 402a) of the first scene. An aperture in the 2D camera may be opened upon receipt of the instructions. Light reflecting off of the first scene may pass through the aperture and enter a lens in the 2D camera. After entering the lens, the light may impinge on an image sensor chip. The image sensor chip may be configured to segment the light into a plurality of pixels that, in totality, create a digital 2D image of the first scene. A plurality of different 2D characteristics may be measured (e.g., by the image sensor chip and/or a 2D camera processor) for each pixel. In certain implementations, the first 2D image data 402a may be comprised of the information associated with the plurality of different 2D characteristics for each of the pixels. The image acquisition system 104 may send the first 2D image data 402a to the vision system 106.

In the example illustrated in FIG. 4A, the first 2D image data 402a includes color information for twenty-eight pixels organized a grid of four rows (e.g., row 1, row 2, row 3, row 4) and seven columns (e.g., column 1, column 2, column 3, column 4, column 5, column 6, column 7). The example first 2D image data 402a indicates blue pixels in the following positions: row 1, columns 1-7; row 2, columns 1 and 7; row 3, columns 1 and 7; and row 4, columns 1-7. The example first 2D image data 402a indicates red pixels in the following positions: row 2, columns 2-6; and row 3, columns 2-6.

The vision system may also obtain one or more first 3D data 404a of the first scene (e.g., the first scene described above in connection with FIG. 3A). The first 3D data 404a may be comprised of depth data assigned to each of plurality of pixels that each represent a different surface area segment of the first scene. The depth data may indicate the distance(s) to each of the surface area segments of the first scene from a point-of-reference (e.g., the 3D camera). The depth data may be obtained using a range camera, e.g., such as a time-of-flight (ToF) camera, a stereo triangulation camera, sheet-of-light triangulation camera, structured light camera, interferometry camera, and/or a coded aperture camera. For simplicity, the operations for obtaining 3D data using a ToF camera are described below. However, it is understood that different operations may be used to obtain 3D data when a different type of 3D camera is used to capture 3D data without departing from the scope of the present invention.

An example technique for obtaining the first 3D data will now be described with reference to FIG. 1. For example, the control/intervention system 102 may instruct the image acquisition system 104, which includes a range camera (e.g., a ToF camera), to obtain 3D data (e.g., first 3D data 402a) of the first scene. An illumination unit (e.g., a light emitting diode (LED), laser diode, infrared light source, etc.) of the ToF camera may illuminate the first scene upon receiving the instructions. A lens of the ToF camera may gathers the light that reflects off the first scene and images the first scene onto the 3D image sensor (e.g., focal plane array). In certain configurations, the ToF camera may include an optical band-pass filter between the lens and the 3D image sensor such that only light with the same wavelength as the light emitted by the illumination unit impinges on the 3D image sensor. The 3D image sensor may include a plurality of pixels (e.g., hundred(s) of thousands or greater than a million pixels) that are each associated with a different surface area segment of the first scene. Taken in totality, the subdivided surface area segments make up the entire surface area of the first scene. Each pixel may measure the time it takes light to travel from the illumination unit to its corresponding surface area segment of the first scene and back to the focal plane array of that pixel. The time it takes light to leave the illumination unit and arrive at a pixel may be correlated to the distance from the 3D camera to that corresponding surface area segment of the first scene. A distance to each surface area segment of the first scene may be calculated based at least in part on the time measured by each of the pixels. Hence, the 3D camera may generate a depth map of the entire surface area of the first scene. The depth map may be comprised of depth data assigned to each surface area segment. The depth data assigned to a surface area segment may indicate a depth of the feature bounded within that surface area segment. In certain implementations, the first 3D data 404a may be comprised of the depth data assigned to each of the pixels, e.g., the depth map of the entire surface area of the first scene. The image acquisition system 104 may send the first 3D data 404a to the vision system 106.

In the example illustrated in FIG. 4A, the first 3D data 404a includes depth data assigned to twenty-eight pixels that are organized into a grid of four rows (e.g., row 1, row 2, row 3, row 4) and seven columns (e.g., column 1, column 2, column 3, column 4, column 5, column 6, column 7). The example first 3D data 404a indicates a distance of 20 cm (e.g., pixels assigned a value of '2') from the 3D camera in the following positions: row 1, columns 1-7; row 2, columns 1 and 7; row 3, columns 1 and 7; and row 4, columns 1-7. The example first 3D data 404a indicates a distance of 90 cm (e.g., pixels assigned a value of '9') in the following positions: row 2, columns 2-6; and row 3, columns 2-6.

The vision system may generate a first aligned model 406a by aligning (401) the one or more first 2D image data 402a and the one or more first 3D data 404a. For example, first 2D image data 402a and the first 3D data 404a may be aligned such that pixels occupying the same position (e.g., row #, column #) in the 2D pixel grid and the 3D pixel correspond to the same surface area segment of the first scene. In certain implementations, the first aligned model 406a may indicate the 2D image data and the 3D data assigned to pixels occupying the same position (e.g., row #, column #) in the first 2D image data 402a and the first 3D data 404a.

In the example illustrated in FIG. 4A, the first aligned model 406a includes color information and depth data for twenty-eight pixels that are organized in the same row and column configuration as the grids in the first 2D image data 402a and the first 3D data 404a. For example, the first aligned model 406a includes pixels organized into a grid comprised of four rows (e.g., row 1, row 2, row 3, row 4) and seven columns (e.g., column 1, column 2, column 3, column 4, column 5, column 6, column 7). The example first aligned model 406a indicates blue pixels and a distance of 20 cm (e.g., pixels assigned a value of '2') from the 3D camera in the following positions: row 1, columns 1-7; row 2, columns 1 and 7; row 3, columns 1 and 7; and row 4, columns 1-7. The example first aligned model 406a indicates red pixels and a distance of 90 cm (e.g., pixels assigned a value of '9') from the 3D camera in the following positions: row 2, columns 2-6; and row 3, columns 2-6.

Figure 4B:
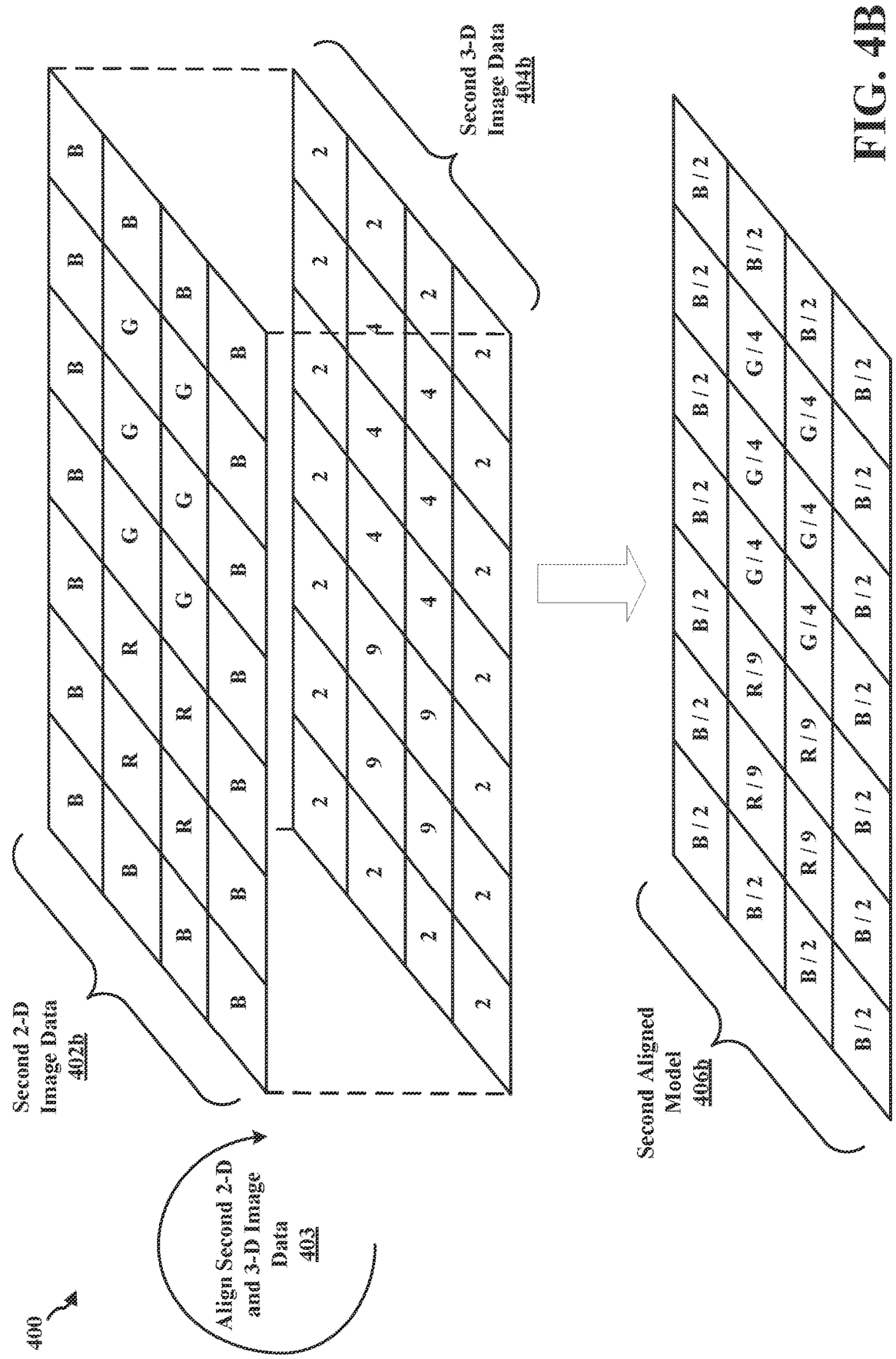
FIG. 4B illustrates an operation that may be performed by a vision system in accordance with certain aspects of the disclosure.

Referring to FIG. 4B, the vision system may obtain second 2D image data 402b of a second scene (e.g. the second scene described above in connection with FIG. 3B).

The second 2D image data 402b may be comprised of a plurality of different 2D characteristics assigned to each of plurality of pixels. The different 2D characteristics assigned to each pixel may represent a color model, e.g., such as a RGB color model, a grayscale color model, a HSB color model, or a HSL color model. In the particular example illustrated in FIG. 4B, the second 2D image data 402b may be comprised of the same color model as that of the first 2D image data 402a, e.g., a RGB color model. In certain implementations, the second 2D image data 402b may be obtained using the same or similar technique described above in connection with obtaining the first 2D image data 402a.

In the example illustrated in FIG. 4B, the second 2D image data 402b includes color information for twenty-eight pixels organized a grid of four rows (e.g., row 1, row 2, row 3, row 4) and seven columns (e.g., column 1, column 2, column 3, column 4, column 5, column 6, column 7). The example second 2D image data 404a indicates blue pixels in the following positions: row 1, columns 1-7; row 2, columns 1 and 7; row 3, columns 1 and 7; and row 4, columns 1-7. The example second 2D image data 402b indicates red pixels in the following positions: row 2, columns 2-3; and row 3, columns 2-3. The example second 2D image data 402b indicates green pixels in the following positions: row 2, columns 4-6; and row 3, columns 4-6.

The vision system may also obtain second 3D data 404b of the second scene (e.g., the second scene described above in connection with FIG. 3B). The second 3D data 404b may be comprised of depth data assigned to each of plurality of pixels that each represent a different surface area segment of the second scene. The depth data may indicate the distance (s) to each of the surface area segments of the second scene from a point-of-reference (e.g., the 3D camera). The depth data may be obtained using a range camera, e.g., such as a ToF camera, a stereo triangulation camera, sheet-of-light triangulation camera, structured light camera, interferometry camera, and/or a coded aperture camera). In certain implementations, the second 3D data 404b may be obtained using the same or similar technique described above in connection with obtaining the first 3D data 404a.

In the example illustrated in FIG. 4B, the second 3D data 404b includes depth data assigned to twenty-eight pixels that are organized into a grid of four rows (e.g., row 1, row 2, row 3, row 4) and seven columns (e.g., column 1, column 2, column 3, column 4, column 5, column 6, column 7). The example second 3D data 404b indicates a distance of 20 cm (e.g., pixels assigned a value of '2') from the 3D camera in the following positions: row 1, columns 1-7; row 2, columns 1 and 7; row 3, columns 1 and 7; and row 4, columns 1-7. The example second 3D data 404b indicates a distance of 90 cm (e.g., pixels assigned a value of '9') in the following positions: row 2, columns 2-3; and row 3, columns 2-3. The example second 3D data 404b indicates a distance of 40 cm (e.g., pixels assigned a value of '4') in the following positions: row 2, columns 4-6; and row 3, columns 4-6.

The vision system may generate a second aligned model 406b by aligning (403) the second 2D image data 402b and the second 3D data 404b. For example, second 2D image data 402b and the second 3D data 404b may be aligned such that pixels occupying the same position (e.g., row #, column #) in the 2D pixel grid and the 3D pixel correspond to the same surface area segment of the first scene. In certain implementations, the second aligned model 406b may indicate the 2D image data and the 3D data assigned to pixels occupying the same position (e.g., row #, column #) in the second 2D image data 402a and the first 3D data 404a.

In the example illustrated in FIG. 4B, the second aligned model 406b includes color information and depth data for twenty-eight pixels that are organized in the same row and column configuration as the pixel grids of the second 2D image data 402b and the second 3D data 404b. For example, the second aligned model 406b in FIG. 4B includes pixels organized into a grid comprised of four rows (e.g., row 1, row 2, row 3, row 4) and seven columns (e.g., column 1, column 2, column 3, column 4, column 5, column 6, column 7). The example second aligned model 406b indicates blue pixels and a distance of 20 cm (e.g., pixels assigned a value of '2') from the 3D camera in the following positions: row 1, columns 1-7; row 2, columns 1 and 7; row 3, columns 1 and 7; and row 4, columns 1-7. The example second aligned model 406b indicates red pixels and a distance of 90 cm (e.g., pixels assigned a value of '9') in the following positions: row 2, columns 2-3; and row 3, columns 2-3. The example second aligned model 406b indicates green pixels and a distance of 40 cm (e.g., pixels assigned a value of '4') in the following positions: row 2, columns 4-6; and row 3, columns 4-6.

Referring to FIG. 4C, the vision system may generate a composite model 408a by aligning (405) the first aligned model 406a and the second aligned model 406b to a frame. By way of example, the frame may be the orientation of a background object (e.g., a bin) that is present in both the first scene and the second scene. By aligning the first and second aligned models 406a, 406b such that data associated with the background object in both models 406a, 406b is aligned, the vision system may be able to determine which surface area segments of the second scene (e.g., the bin 302 containing a box 304 in FIG. 3B) may include a foreground object (e.g., the box 304 illustrated in FIG. 3B). In certain implementations, the composite model 408a indicate the 2D image data and the 3D data assigned to pixels occupying the same position (e.g., row #, column #) in the first and second aligned models 406a, 406b.

Figure 4D:
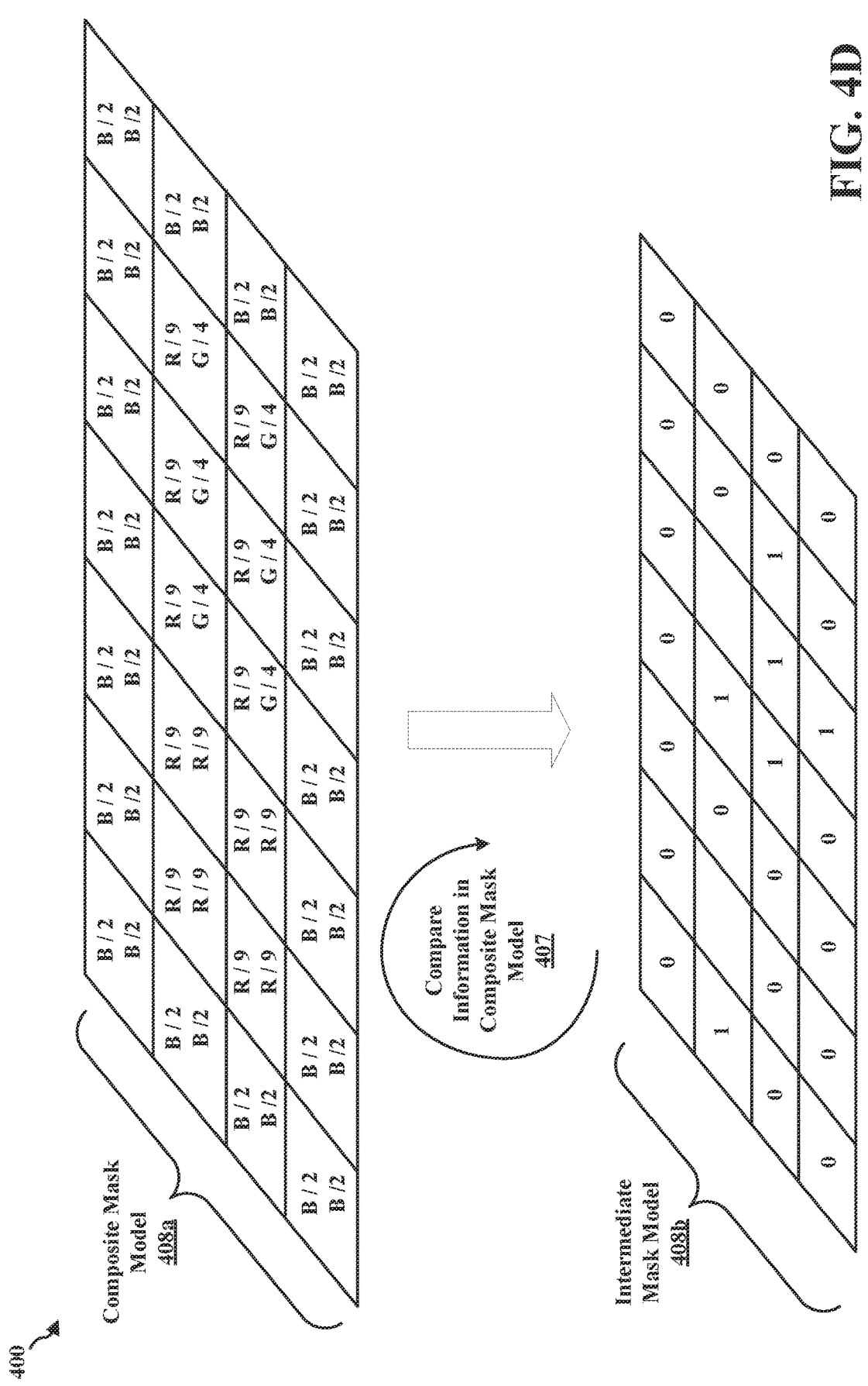
FIG. 4D illustrates an operation that may be performed by a vision system in accordance with certain aspects of the disclosure.

For example, pixels occupying the same position (e.g., row #, column #) in both the first and second aligned models 406a, 406b may be oriented such that 2D image data and 3D data associated with the same or similar surface area segments of the first scene and the second scene can be compared (407) in order to generate (409) an intermediate mask model 408b, as illustrated in FIG. 4D.

In certain implementations, the intermediate mask model 408b may be generated by determining first variance between a pixel in the one or more first 2D image data and the second 2D image data. For each pixel in the composite model 408a, the vision system may compare (409) the associated first 2D image data (e.g., surface area segment color from the first scene) and the second 2D image data (e.g., surface area segment color in the second scene) in order to determine whether there is a difference (e.g., first variance) in 2D characteristics (e.g., color, brightness, intensity, hue, etc.) between the first scene and the second scene.

When the first variance is above a first threshold, the vision system may identify that the 2D characteristics (e.g., color, intensity, hue, brightness, etc.) for a pixel change between the first scene and the second scene. Otherwise, when the first variance is below the first threshold, the vision system may identify that the 2D characteristics for a pixel do not change between the first scene and the second scene. A significant change (e.g., first variance above the first threshold) in 2D characteristics for a pixel may indicate to the vision system that a surface area segment associated with that pixel may contain a foreground object in the second scene.

In certain other implementations, the intermediate mask model 408b may be generated (407) by determining a second variance between the first 3D data and the second 3D data in the composite model 408a. For each pixel in the composite model 408a, the vision system may compare (407) the associated first 3D data (e.g., surface area segment depth from the first scene) and the second 3D data (e.g., surface area segment depth in the second scene) in order to determine whether there is a difference (e.g., second variance) in 3D characteristics (e.g., depth and/or distance from a fixed point) between the first scene and the second scene.

When the second variance is above a second threshold, the vision system may identify that the 3D characteristics (e.g., depth, distance, etc.) for a pixel change between the first scene and the second scene. Otherwise, when the second variance is below the second threshold, the vision system may identify that the 3D characteristics for a pixel do not change between the first scene and the second scene. A significant change (e.g., second variance above the second threshold) in 3D characteristics for a pixel may indicate to the vision system that a surface area segment associated with that pixel may contain a foreground object in the second scene.

In certain implementations, the vision system may generate the intermediate mask model 408b by assigning a first value (e.g., 1) to the pixel when the first variance is above the first threshold or when the second variance is above the second threshold. Otherwise, the vision system may generate the intermediate mask model 408b by assigning a second value (e.g., 0) to the pixel when the first variance is below the first threshold or when the second variance is below the second threshold.

In certain other implementations, the vision system may generate the intermediate mask model 408b by assigning a first value (e.g., 1) to the pixel when the first variance is above the first threshold and when the second variance is above the second threshold. Otherwise, the vision system may generate the intermediate mask model 408b by assigning a second value (e.g., 0) to the pixel when the first variance is below the first threshold and when the second variance is below the second threshold Referring to FIG. 4E, the intermediate mask model 408b, generated by the vision system, may include correct data 420, missing data 430, and erroneous data 440. In certain configurations, the missing 430 and/or erroneous data 440 may be related to image noise. Image noise is random variation of brightness or color information in the first and/or 2D image data, and is usually an aspect of electronic noise. The image noise can be produced by the image sensor of the image acquisition system 104 (e.g., 2D camera(s)) and circuitry associated therewith. Image noise can also originate in film grain and in the unavoidable shot noise of an ideal photon detector. In order to correct the missing data 430 and/or erroneous data 440 caused by image noise, the vision system may augment the intermediate mask model 408b by applying 2D image processing techniques (409) to the intermediate mask model 408b. In certain implementations, the 2D image processing techniques may include one or more of erosion and/or dilation that are used to correct the missing data 430 and/or the erroneous data 440 present in the intermediate mask model 408b.

Erosion and dilation are both morphological operators, which are a set of operations that process images based on shapes. Erosion and dilation each apply a structuring element to an input image and generate an output image. In certain implementations, the vision system may use erosion to remove small white noises and/or to detach two connected objects that are represented in the intermediate mask model 408b. While erosion is useful in removing small white noises from an object, it also shrinks the object. Thus, the vision system may apply dilation to the intermediate mask model 408b after applying erosion in order to increase the object size that is reduced by erosion.

With respect to erosion, the vision system may apply a kernel (e.g., a mathematical matrix of odd size (e.g., 3, 5, 7, etc.) to the intermediate mask model 408b in order to perform a convolution. A pixel in the intermediate mask model 408b (e.g., a value of either '1' or '0') will be considered '1' only if all the pixels under the kernel is '1', otherwise it is eroded (e.g., made '0'). Thus, all the pixels near a boundary of a foreground object (e.g., pixels with a value of '1' in the intermediate mask model 408b) will be discarded depending upon the size of kernel. In other words, the thickness or size of the foreground object decreases after the kernel is applied to the intermediate mask model 408b. The output of erosion may include an eroded intermediate mask model that has fewer pixels assigned a value of 1 in order to remove noise (e.g., correct and/or fill in missing data 430 and/or erroneous data 440). In order to correct the size of the foreground object in the eroded intermediate mask model that no longer has missing data 430 and/or erroneous data 440, the vision system may apply dilation thereto.

With respect to dilation, the vision system a kernel (e.g., a mathematical matrix of odd size (e.g., 3, 5, 7, etc.) to the eroded intermediate mask model in order to perform a convolution. A pixel element in the eroded intermediate mask model is '1' if at least one pixel under the kernel is '1', which increases the size of foreground object. The output of the eroded and dilated intermediate mask model may be an augmented intermediate mask model 408c, as illustrated in FIG. 4E. The augmented intermediate mask model 408c includes a set of object pixels 450 that are indicated with a value of '1' and a set of baseline pixels 460 that are indicated with a value of '0'. The object pixels 450 may include the pixels in the second aligned model 406b that are associated with a foreground object in the second scene.

Although the erosion operations are described before the dilation operations, dilation may occur before erosion without departing from the scope of the present disclosure.

Figure 4F:
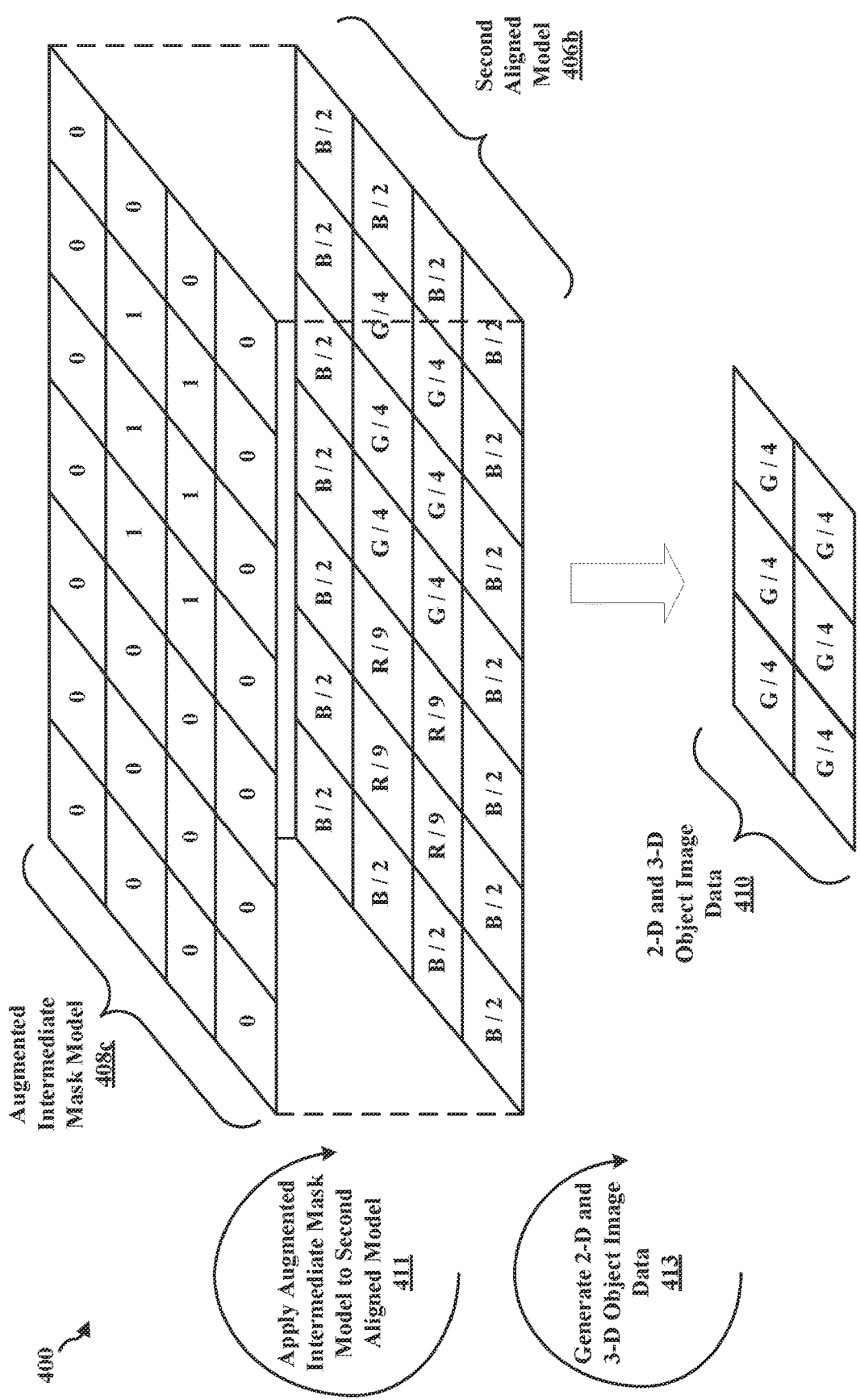
FIG. 4F illustrates an operation that may be performed by a vision system in accordance with certain aspects of the disclosure.

Referring to FIG. 4F, the vision system may generate (413) 2D and 3D object image data 410 by applying (411) the augmented intermediate mask model 408c to the second aligned model 406b (e.g., the second 2D image data and the second 3D data). The pixels in the second aligned model 406b that correspond to the pixels with a value of 1 in the augmented intermediate mask model 408c may correspond to the foreground object in the second scene. The 2D and 3D object image data 410 may correspond to, e.g., the color data and the depth data of the foreground object(s).

FIGS. 5A and 5B are a flowchart 500 for identifying 2D image data and 3D data associated with one or more foreground objects in accordance with certain aspects of the disclosure. The operations performed in FIGS. 5A and 5B may be performed by a vision system, e.g., vision system 106, 206, computing device 10, and/or the computer system 40.

Referring to FIG. 5A, at 502, the vision system may obtain one or more first 2D image data, e.g., as described above in connection with FIG. 4A. At 504, the vision system may obtain one or more ore more first 3D data, e.g., as described above in connection with FIG. 4A. In certain aspects, the one or more first 2D image data and the one or more 3D data may correspond to a first scene, e.g., first scene 30 in FIG. 3A. At 506, the vision system may generate a first aligned model by aligning the one or more first 2D image data and the one or more first 3D data, e.g., as described above in connection with FIG. 4A. In certain aspects, the aligning the one or more first 2D image data and the one or more first 3D data is comprised of aligning first pixels in the one or more first 2D image data to second pixels in the one or more first 3D data.

At 508, the vision system may obtain a second 2D image data, e.g., as described above in connection with FIG. 4B. At 510, the vision system may obtain a second 3D data, e.g., as described above in connection with FIG. 4B. In certain aspects, the second 2D image data and the second 3D data correspond to a second scene, e.g., second scene 310 in FIG. 3B. At 512, the vision system may generate a second aligned model by aligning the second 2D image data and the second 3D data, e.g., as described above in connection with FIG. 4B. In certain aspects, the aligning the second 2D image data and the second 3D data is comprised of aligning third pixels in the second 2D image data to fourth pixels in the second 3D data At 514, the vision system may generate a composite model by aligning the first aligned model and the second aligned model to a frame, e.g., as described above in connection with FIG. 4C. At 516, the vision system may compare the one or more first 2D image data to the second 2D image data and compare the one or more first 3D data to the second 3D data, e.g., as described above in connection with FIG. 4D. At 518, the vision system may generate an intermediate mask model based on the comparison of the first 2D image data/second 2D image data and the first 3D data/second 3D data, e.g., as described above in connection with FIG. 4D.

At 520, the vision system may augment the intermediate mask model by applying 2D image processing techniques to the intermediate mask model, e.g., as described above in connection with FIG. 4E. At 522, the vision system may generate a 2D object image data and/or a 3D object image data by applying the augmented mask model to the second 2D image data and/or the second 3D data, e.g., as described above in connection with FIG. 4F. In certain aspects, the 2D object image data and the 3D object image data may identify one or more objects associated with the second 2D image data and the second 3D data and that are not associated with the one or more first 2D image data and the one or more first 3D data.

Referring to FIG. 5B, at 524, the vision system may apply statistical analysis to identify pick points for picking the one or more objects identified in the 2D object image data and the 3D object image data. At 526, the vision system may instruct a robot to pick the one or more objects identified in the 2D object image data and the 3D object image data. At 528, the vision system may identify a new placement location for the one or more objects identified in the 2D object image data and the 3D object image data. At 530, the vision system may compute a collision-free trajectory from the pick points to the new placement location. At 532, the vision system may send instructions for displacing the one or more objects if a result of the statistical analysis is less than is less than a threshold. In certain aspects, the instructions for displacing the one or more objects may include one or more of agitating or stirring the one or more objects.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 6, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 6 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

In some embodiments, systems may be implemented on a standalone computing system. Referring now to FIG. 7, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 6). Examples of storage devices 26 include flash memory, magnetic hard drive, CD-ROM, and/or the like.

In some embodiments, systems may be implemented on a distributed computing network, such as one having any number of clients and/or servers. Referring now to FIG. 8, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 7. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

FIG. 9 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A method of identifying objects to be moved by an industrial automatic robotics picking system, comprising:

obtaining one or more first two-dimensional (2D) image data;
obtaining one or more first three-dimensional (3D) data, the one or more first 2D image data and the one or more 3D data corresponding to a first scene;
generating a first aligned model by aligning the one or more first 2D image data and the one or more first 3D data;
obtaining a second 2D image data;
obtaining a second 3D data, the second 2D image data and the second 3D data corresponding to a second scene;
generating a second aligned model by aligning the second 2D image data and the second 3D data;
generating a composite model by aligning the first aligned model and the second aligned model to a frame;
generating an intermediate mask model from the composite model by comparing the one or more first 2D image data to the second 2D image data and by comparing the one or more first 3D data to the second 3D data;
augmenting the intermediate mask model by applying 2D image processing techniques to the intermediate mask model;
generating a 2D object image data and a 3D object image data by applying an augmented mask model to the second 2D image data and the second 3D data, the 2D object image data and the 3D object image data identifying one or more objects associated with the second 2D image data and the second 3D data and that are not associated with the one or more first 2D image data and the one or more first 3D data; and
applying statistical analysis to identify pick points for picking the one or more objects identified in the 2D object image data and the 3D object image data.

2. The method of claim 1, wherein:
the one or more first 2D image data and the second 2D image data are comprised of at least one of, a red, green, and blue color model, a grayscale color model, a hue, saturation, brightness (HSB) color model, or a hue, saturation, lightness (HSL) color model, and the one or more first 3D data and the second 3D data are comprised of depth data or range data.

3. The method of claim 1, wherein:
the aligning the one or more first 2D image data and the one or more first 3D data is comprised of aligning first pixels in the one or more first 2D image data to second pixels in the one or more first 3D data, and
the aligning the second 2D image data and the second 3D data is comprised of aligning third pixels in the second 2D image data to fourth pixels in the second 3D data.

4. The method of claim 1, wherein the 2D processing technique is comprised of applying erosion to the intermediate mask model.

5. The method of claim 1, wherein the 2D processing technique is comprised of applying dilation to the intermediate mask model.

6. The method of claim 1, further comprising:
augmenting the intermediate mask model by removing noise.

7. The method of claim 1, further comprising:
instructing a robot to pick the one or more objects identified in the 2D object image data and the 3D object image data.

8. The method of claim 1, further comprising:
identifying a new placement location for the one or more objects identified in the 2D object image data and the 3D object image data; and computing a collision-free trajectory from the pick points to the new placement location.

9. The method of claim 1, further comprising:
sending instructions for displacing the one or more objects if a result of the statistical analysis is less than is less than a threshold.

10. The method of claim 9, wherein the instructions for displacing the one or more objects comprise one or more of agitating or stirring the one or more objects.

11. A method of identifying objects to be moved by an industrial automatic robotics picking system, comprising:
obtaining one or more first two-dimensional (2D) image data;
obtaining one or more first three-dimensional (3D) data, the one or more first 2D image data and the one or more 3D data corresponding to a first scene;
generating a first aligned model by aligning the one or more first 2D image data and the one or more first 3D data;
obtaining a second 2D image data;
obtaining a second 3D data, the second 2D image data and the second 3D data corresponding to a second scene;
generating a second aligned model by aligning the second 2D image data and the second 3D data;
generating a composite model by aligning the first aligned model and the second aligned model to a frame;
generating an intermediate mask model from the composite model by comparing the one or more first 2D image data to the second 2D image data and by comparing the one or more first 3D data to the second 3D data, wherein the intermediate mask is generated by determining a first variance between a pixel in the one or more first 2D image data and the second 2D image data and by determining whether the first variance is above a first threshold;
augmenting the intermediate mask model by applying 2D image processing techniques to the intermediate mask model; and
generating a 2D object image data and a 3D object image data by applying an augmented mask model to the second 2D image data and the second 3D data, the 2D object image data and the 3D object image data identifying one or more objects associated with the second 2D image data and the second 3D data and that are not associated with the one or more first 2D image data and the one or more first 3D data.

12. The method of claim 11, wherein the generating the intermediate mask model further comprises:
determining a second variance between the pixel in the one or more first 3D data and the second 3D data; and
determining whether the second variance is above a second threshold.

13. The method of claim 12, wherein the generating the intermediate mask model further comprises:
assigning a first value to the pixel when the first variance is above the first threshold or when the second variance is above the second threshold; and
assigning a second value to the pixel when the first variance is below the first threshold or when the second variance is below the second threshold.

14. The method of claim 12, wherein the generating the intermediate mask model further comprises:
assigning a first value to the pixel when the first variance is above the first threshold and when the second variance is above the second threshold; and assigning a second value to the pixel when the first variance is below the first threshold and when the second variance is below the second threshold.

15. The method of claim 11, wherein, the pixel that has the first variance above the first threshold is identified as changed, and the pixel that has the first variance below the first threshold is identified as unchanged.

16. The method of claim 12, wherein the pixel that has the second variance above the second threshold is identified as changed, and the pixel that has the second variance below the second threshold is identified as unchanged.

17. A computing system for identifying objects to be moved by an industrial automatic robotics picking system, the computing system comprising:
- obtaining one or more first two-dimensional (2D) image data;
- obtaining one or more first three-dimensional (3D) data, the one or more first 2D image data and the one or more 3D data corresponding to a first scene;
- generating a first aligned model by aligning the one or more first 2D image data and the one or more first 3D data;
- obtaining a second 2D image data;
- obtaining a second 3D data, the second 2D image data and the second 3D data corresponding to a second scene;
- generating a second aligned model by aligning the second 2D image data and the second 3Ddata;
- generating a composite model by aligning the first aligned model and the second aligned model to a frame;
- generating an intermediate mask model from the composite model by comparing the one or more first 2D image data to the second 2D image data and by comparing the one or more first 3D data to the second 3D data;
- augmenting the intermediate mask model by applying 2D image processing techniques to the intermediate mask model;
- generating a 2D object image data and a 3D object image data by applying an augmented mask model to the second 2D image data and the second 3D data, the 2D object image data and the 3D object image data identifying one or more objects associated with the second 2D image data and the second 3D data and that are not associated with the one or more first 2D image data and the one or more first 3D data; and
- applying statistical analysis to identify pick points for picking the one or more objects identified in the 2D object image data and the 3D object image data.

18. A non-transitory computer readable storage medium storing instructions that, when executed by a computing device processor of a computing system, causes the computing system to:
- obtain one or more first two-dimensional (2D) image data;
- obtain one or more first three-dimensional (3D) data, the one or more first 2D image data and the one or more 3D data corresponding to a first scene;
- generate a first aligned model by aligning the one or more first 2D image data and the one or more first 3D data;
- obtain a second 2D image data;
- obtain a second 3D data, the second 2D image data and the second 3D data corresponding to a second scene;
- generate a second aligned model by aligning the second 2D image data and the second 3Ddata;
- generate a composite model by aligning the first aligned model and the second aligned model to a frame;
- generate an intermediate mask model from the composite model by comparing the one or more first 2D image data to the second 2D image data and by comparing the one or more first 3D data to the second 3D data;
- augment the intermediate mask model by applying 2D image processing techniques to the intermediate mask model;
- generate a 2D object image data and a 3D object image data by applying an augmented mask model to the second 2D image data and the second 3D data, the 2D object image data and the 3D object image data identifying one or more objects associated with the second 2D image data and the second 3D data and that are not associated with the one or more first 2D image data and the one or more first 3D data; and
- applying statistical analysis to identify pick points for picking the one or more objects identified in the 2D object image data and the 3D object image data.

\* \* \* \* \*